United States Patent
Paz et al.

(10) Patent No.: US 12,557,045 B2
(45) Date of Patent: Feb. 17, 2026

(54) VARIABLE SYNCHRONIZATION SIGNAL BLOCK COMMUNICATION

(71) Applicant: QUALCOMM Incorporated, San Diego, CA (US)

(72) Inventors: Daniel Paz, Geva Carmel (IL); Michael Levitsky, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 640 days.

(21) Appl. No.: 17/662,609

(22) Filed: May 9, 2022

(65) Prior Publication Data

US 2023/0362845 A1    Nov. 9, 2023

(51) Int. Cl.
*H04W 56/00*    (2009.01)
*H04L 5/00*    (2006.01)
*H04W 76/10*    (2018.01)

(52) U.S. Cl.
CPC ......... *H04W 56/001* (2013.01); *H04L 5/0048* (2013.01); *H04W 76/10* (2018.02)

(58) Field of Classification Search
CPC ............... H04W 56/001; H04W 76/10; H04W 56/0005; H04L 5/0048; H04L 5/0053; H04L 5/0091
See application file for complete search history.

(56) References Cited

U.S. PATENT DOCUMENTS

| | | | |
|---|---|---|---|
| 9,144,016 B2 * | 9/2015 | Frenger | H04W 52/0216 |
| 10,356,740 B2 * | 7/2019 | Zhang | H04W 56/0045 |
| 10,362,610 B2 * | 7/2019 | Chen | H04L 5/0048 |
| 11,147,032 B1 * | 10/2021 | Marupaduga | H04W 24/08 |
| 2015/0305079 A1 * | 10/2015 | Wu | H04W 24/08 370/329 |
| 2018/0109344 A1 * | 4/2018 | Ly | H04L 27/00 |
| 2018/0270772 A1 * | 9/2018 | Ly | H04W 56/001 |
| 2018/0295654 A1 * | 10/2018 | Astrom | H04W 68/02 |
| 2019/0052443 A1 * | 2/2019 | Cheng | H04L 5/0023 |
| 2019/0090185 A1 * | 3/2019 | Rune | H04W 52/0209 |
| 2019/0191403 A1 * | 6/2019 | Goel | H04L 27/2695 |
| 2019/0229973 A1 * | 7/2019 | Sengupta | H04J 11/0079 |
| 2021/0204175 A1 * | 7/2021 | Rangaraju | H04W 12/037 |
| 2021/0360550 A1 * | 11/2021 | Ying | H04W 24/10 |
| 2022/0104154 A1 * | 3/2022 | Wei | H04W 56/001 |
| 2022/0141750 A1 * | 5/2022 | Liu | H04W 36/0007 455/437 |
| 2023/0232314 A1 * | 7/2023 | Koskinen | H04W 48/12 370/311 |

(Continued)

FOREIGN PATENT DOCUMENTS

WO    WO-2021160606 A1 *    8/2021    ........... H04B 17/318

*Primary Examiner* — Jackie Zuniga Abad
*Assistant Examiner* — Latresa A Mccallum
(74) *Attorney, Agent, or Firm* — Harrity & Harrity, LLP

(57) ABSTRACT

Various aspects of the present disclosure generally relate to wireless communication. In some aspects, a user equipment (UE) may receive, during a first portion of a time cycle, one or more synchronization signal blocks (SSBs) according to a first periodicity. The UE may receive, during a second portion of the time cycle, one or more other SSBs according to a second periodicity that is higher than the first periodicity. Numerous other aspects are described.

30 Claims, 13 Drawing Sheets

(56) References Cited

U.S. PATENT DOCUMENTS

| | | | |
|---|---|---|---|
| 2023/0246764 A1* | 8/2023 | Laselva | H04L 5/0057 |
| | | | 370/329 |
| 2024/0057052 A1* | 2/2024 | Zhao | H04W 72/0453 |
| 2024/0284233 A1* | 8/2024 | Maleki | H04L 5/0048 |
| 2025/0008450 A1* | 1/2025 | Matsumura | H04L 5/0048 |

* cited by examiner

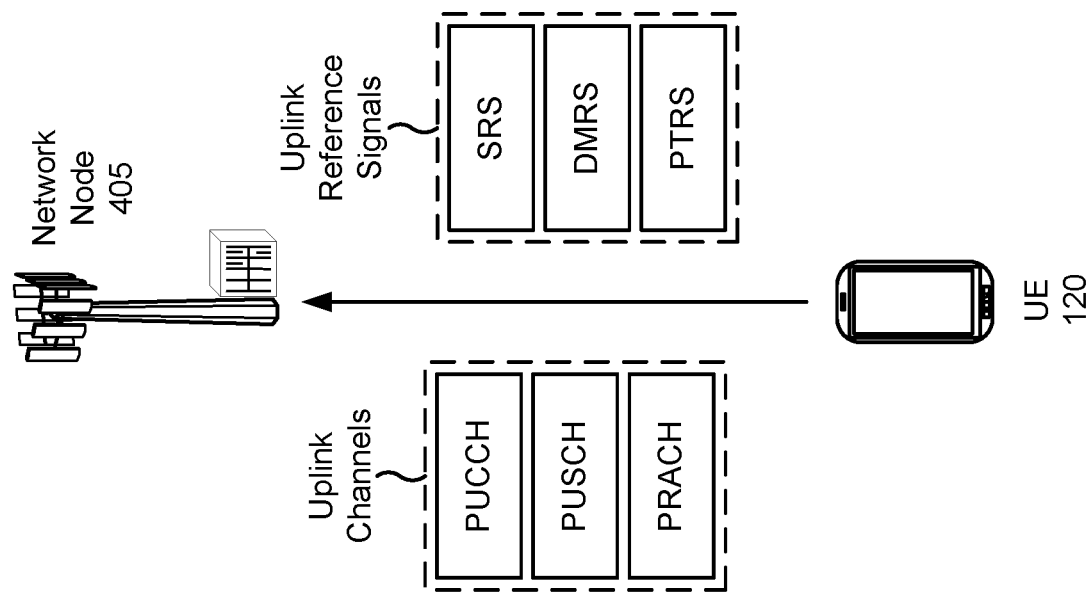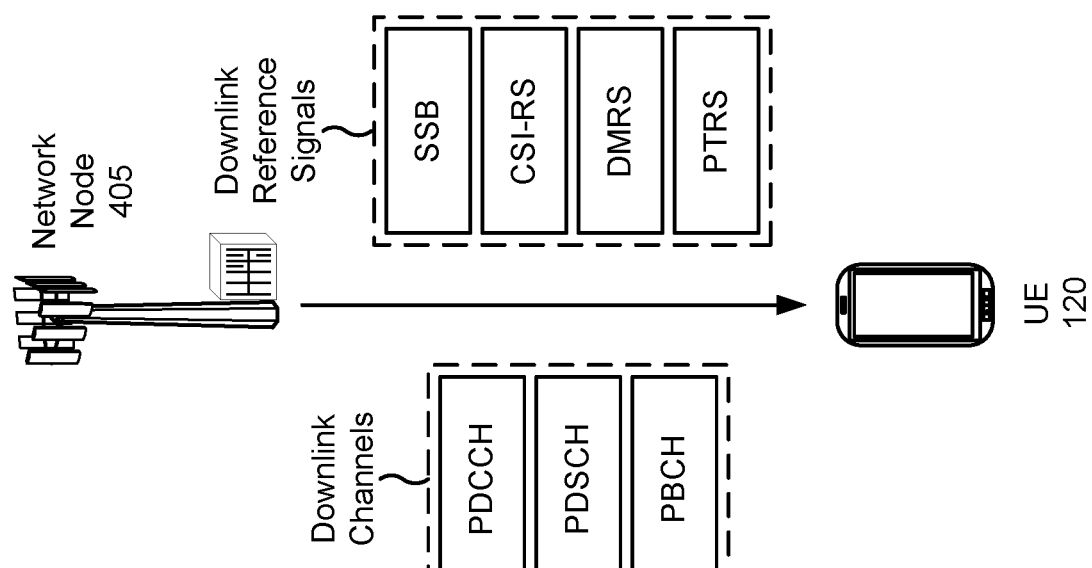
FIG. 4

VARIABLE SYNCHRONIZATION SIGNAL BLOCK COMMUNICATION

FIELD OF THE DISCLOSURE

Aspects of the present disclosure generally relate to wireless communication and to techniques and apparatuses for variable synchronization signal block communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, during a first portion of a time cycle, one or more synchronization signal blocks (SSBs) according to a first periodicity. The method may include receiving, during a second portion of the time cycle, one or more other SSBs according to a second periodicity that is higher than the first periodicity.

Some aspects described herein relate to a method of wireless communication performed by a network node. The method may include transmitting, during a first portion of a time cycle, one or more SSBs according to a first periodicity. The method may include transmitting, during a second portion of the time cycle, one or more other SSBs according to a second periodicity that is higher than the first periodicity.

Some aspects described herein relate to an apparatus for wireless communication performed by a UE. The apparatus may include a memory and one or more processors, coupled to the memory. The one or more processors may be configured to receive, during a first portion of a time cycle, one or more SSBs according to a first periodicity. The one or more processors may be configured to receive, during a second portion of the time cycle, one or more other SSBs according to a second periodicity that is higher than the first periodicity.

Some aspects described herein relate to an apparatus for wireless communication performed by a network node. The apparatus may include a memory and one or more processors, coupled to the memory. The one or more processors may be configured to transmit, during a first portion of a time cycle, one or more SSBs according to a first periodicity. The one or more processors may be configured to transmit, during a second portion of the time cycle, one or more other SSBs according to a second periodicity that is higher than the first periodicity.

Some aspects described herein relate to a non-transitory computer-readable medium that stores a set of instructions for wireless communication by a UE. The set of instructions, when executed by one or more processors of the UE, may cause the UE to receive, during a first portion of a time cycle, one or more SSBs according to a first periodicity. The set of instructions, when executed by one or more processors of the UE, may cause the UE to receive, during a second portion of the time cycle, one or more other SSBs according to a second periodicity that is higher than the first periodicity.

Some aspects described herein relate to a non-transitory computer-readable medium that stores a set of instructions for wireless communication by a network node. The set of instructions, when executed by one or more processors of the network node, may cause the network node to transmit, during a first portion of a time cycle, one or more SSBs according to a first periodicity. The set of instructions, when executed by one or more processors of the network node, may cause the network node to transmit, during a second portion of the time cycle, one or more other SSBs according to a second periodicity that is higher than the first periodicity.

Some aspects described herein relate to an apparatus for wireless communication. The apparatus may include means for receiving, during a first portion of a time cycle, one or more SSBs according to a first periodicity. The apparatus may include means for receiving, during a second portion of the time cycle, one or more other SSBs according to a second periodicity that is higher than the first periodicity.

Some aspects described herein relate to an apparatus for wireless communication. The apparatus may include means for transmitting, during a first portion of a time cycle, one or more SSBs according to a first periodicity. The apparatus may include means for transmitting, during a second portion of the time cycle, one or more other SSBs according to a second periodicity that is higher than the first periodicity.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of physical channels and reference signals in a wireless network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
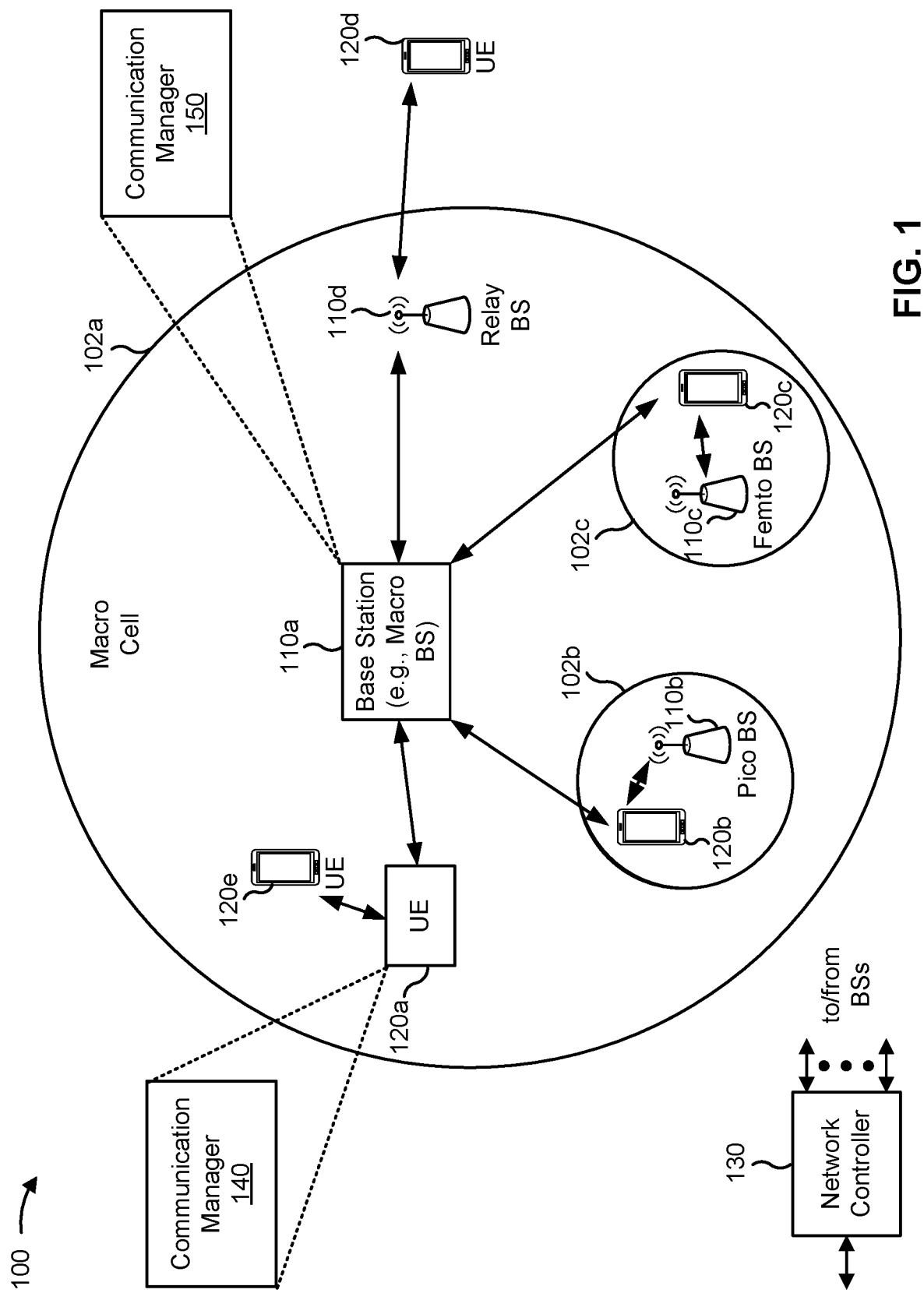
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although depicted as an integral unit in FIG. 1, aspects of the disclosure are not so limited. In some other aspects, the functionality of the base station 110 may be disaggregated according to an open radio access network (RAN) (O-RAN) architecture or the like, which is described in more detail in connection with FIG. 3. Each base station 110 may provide communication coverage for a particular geographic area. In 3GPP, the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, during a first portion of a time cycle, one or more synchronization signal blocks (SSBs) according to a first periodicity; and receive, during a second portion of the time cycle, one or more other SSBs according to a second periodicity that is higher than the first periodicity. Additionally, or alternatively, the communication manager 140 may perform one or more other operations described herein.

In some aspects, a network node (e.g., the base station 110) may include a communication manager 150. As described in more detail elsewhere herein, the communication manager 150 may transmit, during a first portion of a time cycle, one or more SSBs according to a first periodicity; and transmit, during a second portion of the time cycle, one or more other SSBs according to a second periodicity that is higher than the first periodicity. Additionally, or alternatively, the communication manager 150 may perform one or more other operations described herein.

As indicated above, FIG. 1 is provided as an example. Other examples may differ from what is described with regard to FIG. 1.

Figure 2:
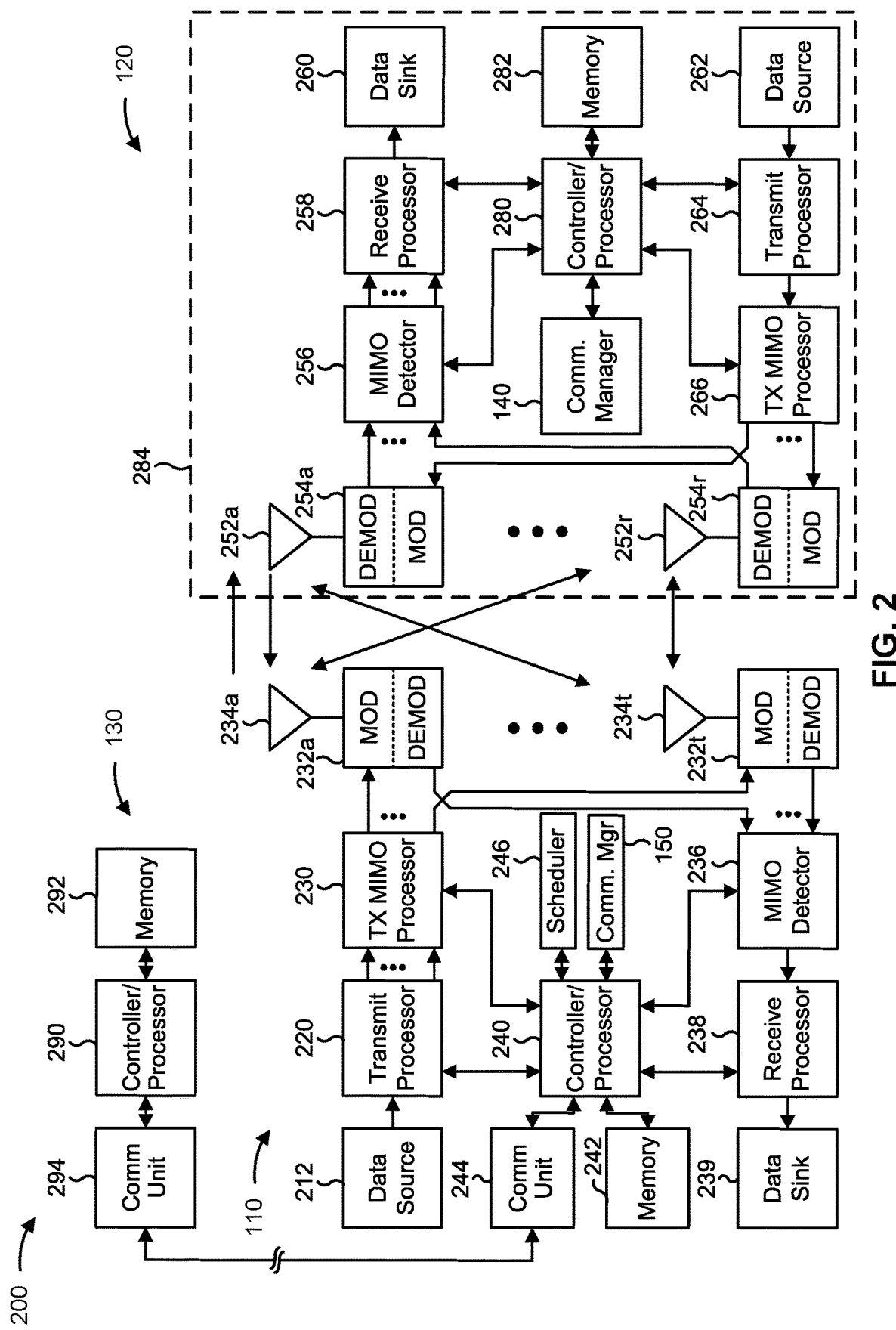
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a PSS or an SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-12).

The controller/processor 240 of the base station 110, the controller/processor 280 of the UE 120, and/or any other component(s) of FIG. 2 may perform one or more techniques associated with variable SSB communication, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE includes means for receiving, during a first portion of a time cycle, one or more SSBs according to a first periodicity; and/or means for receiving, during a second portion of the time cycle, one or more other SSBs according to a second periodicity that is higher than the first periodicity. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node includes means for transmitting, during a first portion of a time cycle, one or more SSBs according to a first periodicity; and/or means for transmitting, during a second portion of the time cycle, one or more other SSBs according to a second periodicity that is higher than the first periodicity. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
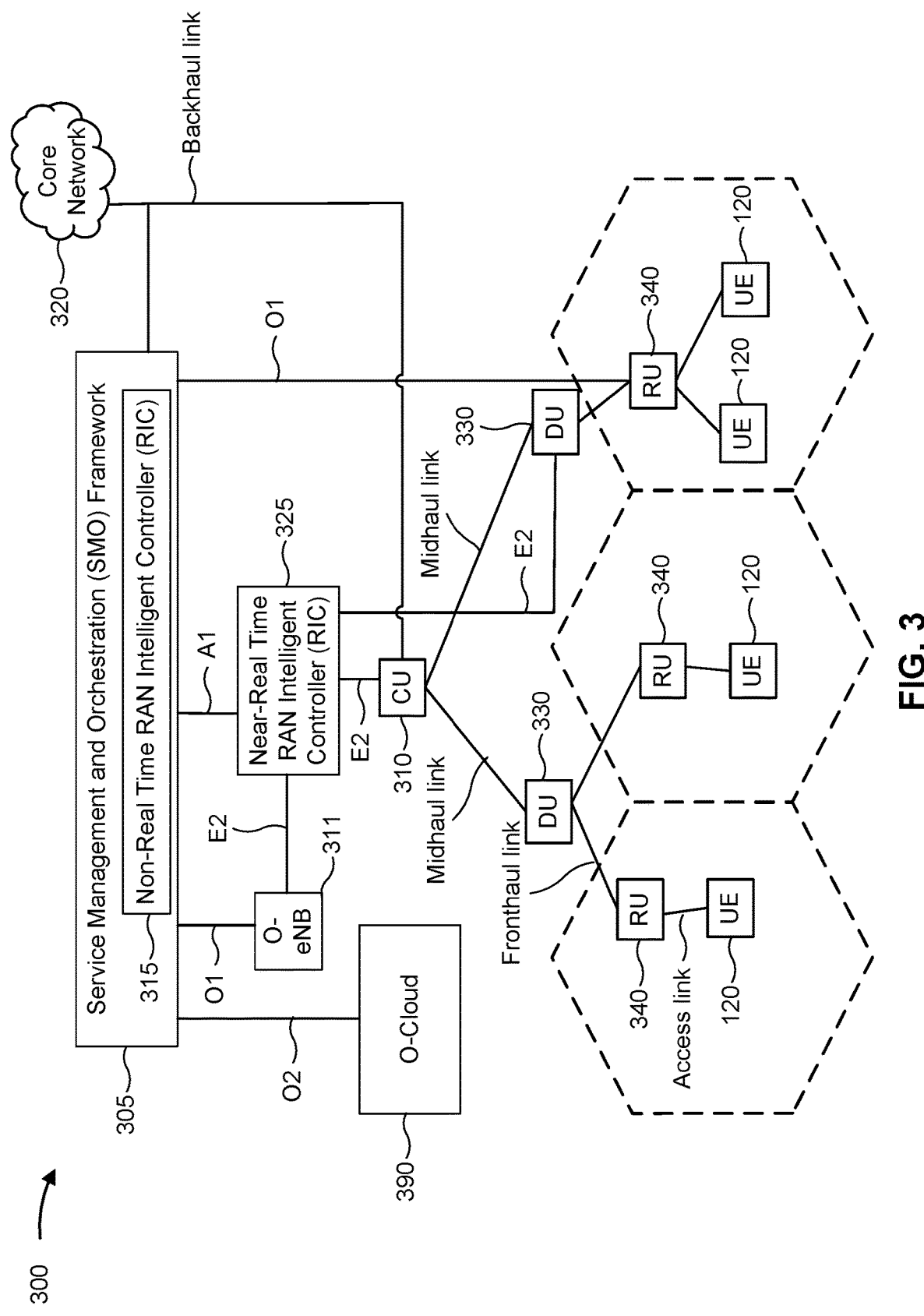
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

FIG. 4 is a diagram illustrating an example 400 of physical channels and reference signals in a wireless network, in accordance with the present disclosure. As shown in FIG. 4, downlink channels and downlink reference signals may carry information from a network node 405 to a UE 120, and uplink channels and uplink reference signals may carry information from a UE 120 to a network node 405. The network node 405 may include some or all of the features of the base station 110, the CU 310, the DU 330, and/or the RU 340.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include an SSB, a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network node 405 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 405 may configure a set of CSI-RSs for the UE 120, and the UE 120 may measure the configured set of CSI-RSs. Based at least in part on the measurements, the UE 120 may perform channel estimation and may report channel estimation parameters to the network node 405 (e.g., in a CSI report), such as a CQI, a precoding matrix indicator (PMI), a CSI-RS resource indicator (CRI), a layer indicator (LI), a rank indicator (RI), or an RSRP, among other examples. The network node 405 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 405 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 405 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 405 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 405 may measure the SRSs, may perform channel estimation based at least in part on the measurements, and may use the SRS measurements to configure communications with the UE 120.

In some aspects, the SSB may have a variable periodicity that is based at least in part on an initial acquisition portion of a time cycle and a beam management portion of the time cycle. Additional details regarding these features are described in detail below.

As indicated above, FIG. 4 is provided as an example. Other examples may differ from what is described with regard to FIG. 4.

Figure 5A:
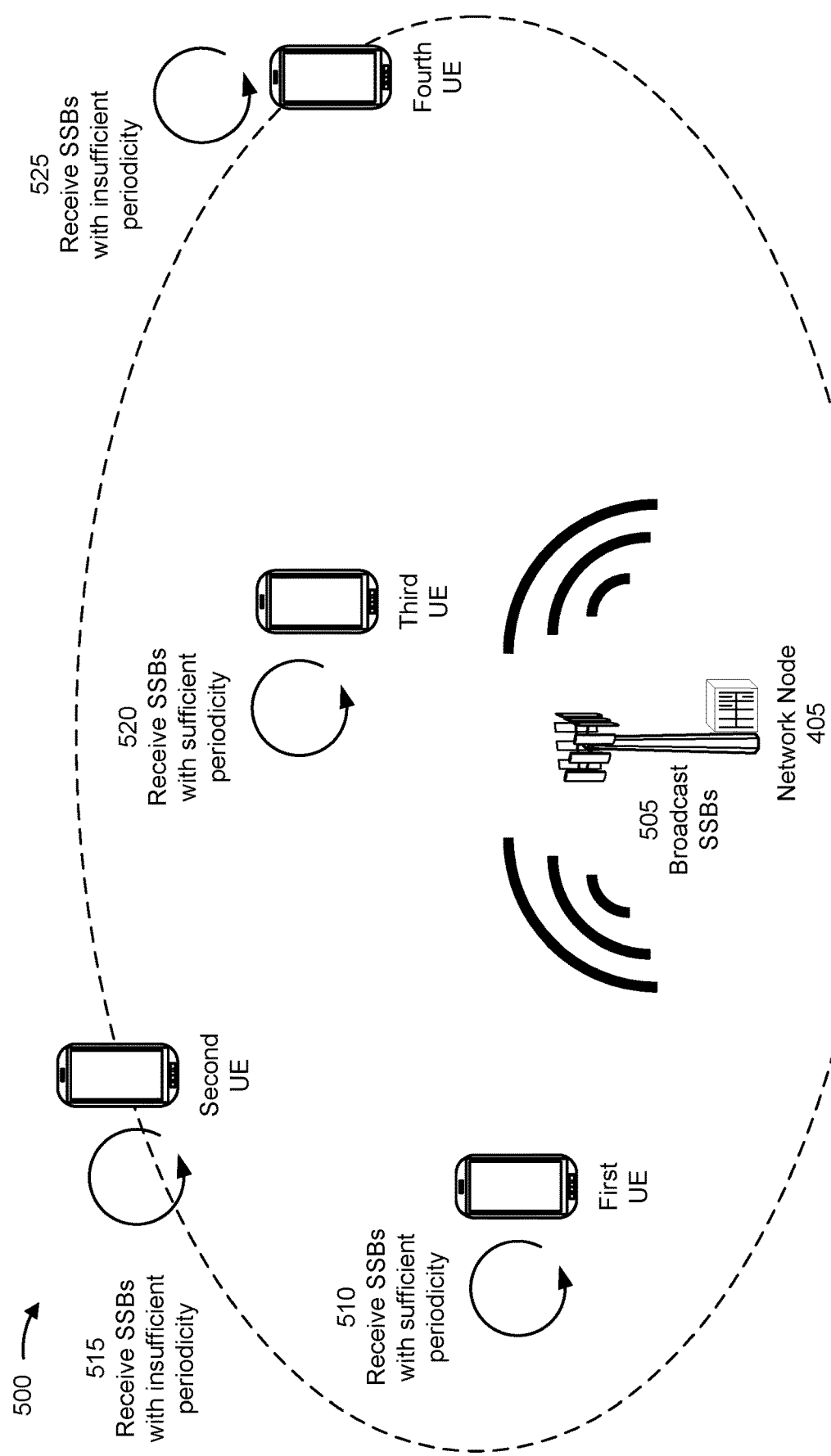
FIGS. 5A-5B are diagrams illustrating example of synchronization signal block (SSB) broadcasting, in accordance with the present disclosure.
Figure 5B:
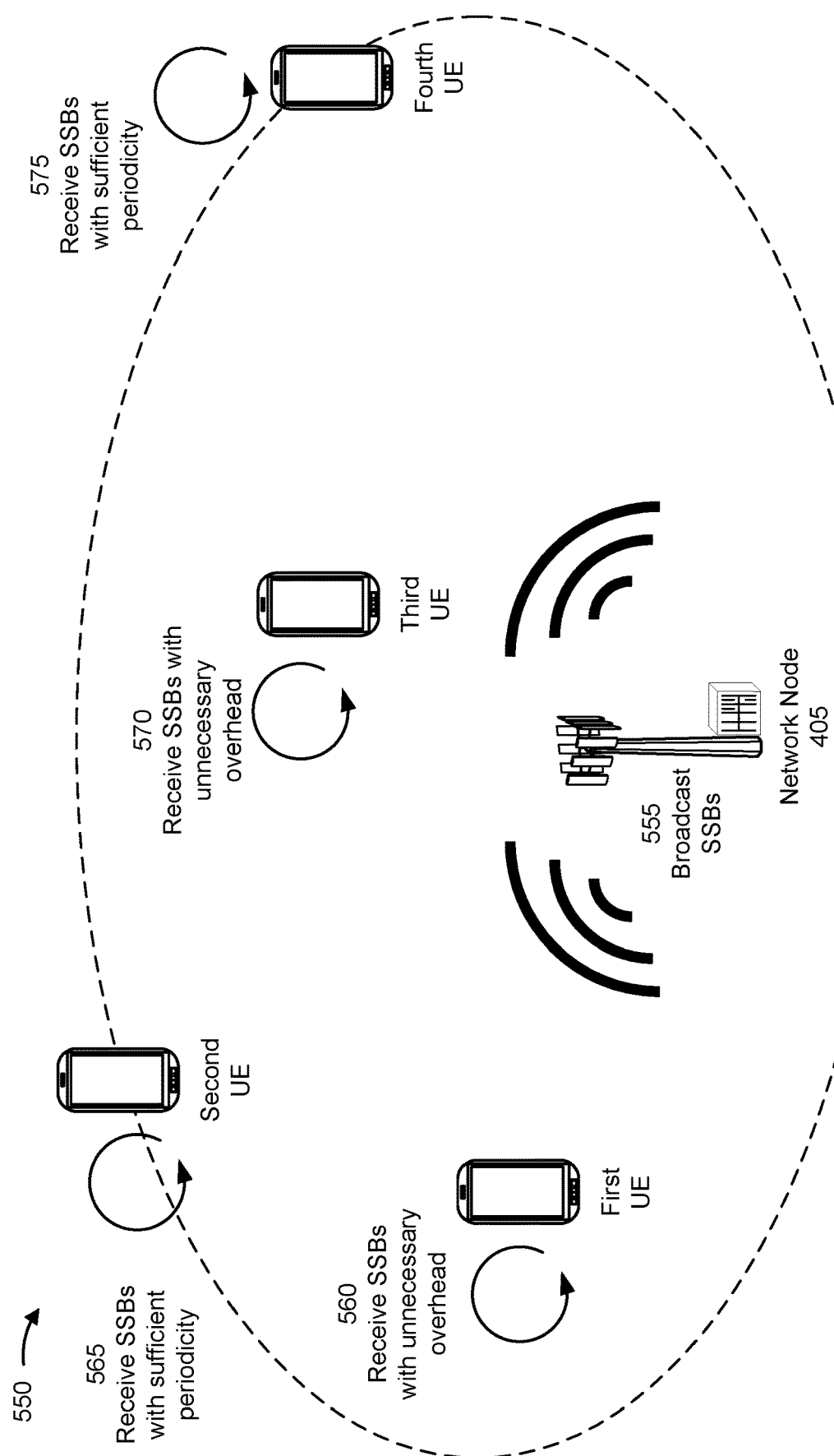

FIGS. 5A and 5B are diagrams illustrating examples 500 and a 550 of SSB broadcasting, in accordance with the present disclosure. In some networks, a network node (such as the network node 405) may be configured to provide one or more SSBs to support connections within a cell of the network. For example, the network node may provide SSBs to support acquisition of the cell (e.g., initial acquisition), synchronization of the cell (e.g., frequency synchronization and/or time synchronization), and/or beam management, among other examples.

As shown in FIG. 5A, and by reference number 505, a network node may broadcast SSBs within the cell. The SSBs may have a relatively high periodicity to conserve network resources (e.g., overhead). For example, the SSBs may have a periodicity of 40 milliseconds or more.

As shown by reference number 510, a first UE may receive the SSBs with sufficient periodicity to maintain a connection with the cell. For example, the SSBs may have a periodicity that supports frequency synchronization, time synchronization, and/or beam management for the first UE. The periodicity of the SSBs may be sufficient based at least in part on the UE having a signal-to-noise ratio (SNR) and/or a signal-to-interference-plus-noise ratio (SINR) that satisfies a threshold.

As shown by reference number 515, a second UE may receive the SSBs with insufficient periodicity to maintain a connection with the cell. For example, the SSBs may not have a periodicity that supports frequency synchronization, time synchronization, and/or beam management for the second UE. The periodicity of the SSBs may be insufficient based at least in part on the UE having an SNR and/or an SINR that fails to satisfy a threshold.

Similarly, as shown by reference number 520, a third UE may receive the SSBs with sufficient periodicity to maintain a connection with the cell. As shown by reference number 525, a fourth UE may receive the SSBs with insufficient periodicity to maintain a connection with the cell.

In example 500, the periodicity of the SSBs may prioritize spectral efficiency (e.g., reduction in overhead) over supporting connections for UEs at the cell edge. In this case, network, communication, power, and/or computing resources are unnecessarily consumed to attempt to reestablish connections with UEs at the cell edge.

As shown in FIG. 5B, and by reference number 555, a network node may broadcast SSBs within the cell. The SSBs may have a relatively low periodicity (e.g., in comparison with a periodicity shown in FIG. 5A) to support maintenance of connection to the cell for UEs at a cell edge. However, the periodicity may unnecessarily consume network resources (e.g., create unnecessary overhead) for UEs with signal strengths (e.g., SNRs or SINRs) that satisfy a threshold. For example, the SSBs may have a periodicity of 40 milliseconds or less.

As shown by reference number 560, a first UE may receive the SSBs with sufficient periodicity to maintain a connection with the cell, but with unnecessary overhead. For example, the SSBs may have a periodicity that is more than necessary to support frequency synchronization, time synchronization, and/or beam management for the first UE. The periodicity of the SSBs may be more than sufficient based at least in part on the UE having an SNR and/or an SINR that satisfies a threshold.

As shown by reference number 565, a second UE may receive the SSBs with a sufficient periodicity to maintain a connection with the cell (e.g., without unnecessary overhead). For example, the SSBs may have a periodicity that supports frequency synchronization, time synchronization, and/or beam management for the second UE. The periodicity of the SSBs may be sufficient based at least in part on the UE having an SNR and/or an SINR that satisfies a threshold and/or based at least in part on the periodicity being configured for UEs at the cell edge.

Similarly, as shown by reference number 570, a third UE may receive the SSBs with sufficient periodicity to maintain a connection with the cell, but with unnecessary overhead. As shown by reference number 575, a fourth UE may receive the SSBs with sufficient periodicity to maintain a connection with the cell.

In example 550, the periodicity of the SSBs may prioritize supporting connections for UEs at the cell edge over spectral efficiency. In this case, network, communication, power, and/or computing resources are unnecessarily consumed to support connections at the cell edge.

In some networks, such as high-frequency (e.g., sub-terahertz (SubThz)) networks, a relatively low SSB periodicity (e.g., relatively high SSB density) may be required for initial acquisition, initial synchronization loop convergence, and steady state synchronization loop tracking. This may be based at least in part on the SubThz frequencies having an increased sensitivity to timing drift and/or parts per million (PPM) error (e.g., due to a lower numerology) and/or a degraded accuracy of frequency offset (FO)/PPM error estimation. In some cases, the lower SSB periodicity may be required to enable a required rate of loop updates for initial convergence and a required level of residual frequency and timing errors at the loop output to reach a steady state. In some cases, a non-coherent combining of SSB detection peaks across several SSBs may be required for initial acquisition (InitAck) to support sufficient coverage characteristics, such as detection at a lowest targeted negative SNR. Additionally, or alternatively, a time gap between consecutive SSBs (an SSB period) that are used for detection peak combining may be smaller (e.g., compared to other bands) due to timing-drift-related sensitivity and uncertainty.

During a connected mode, a frequency and/or time synchronization may be maintained based at least in part on SSBs and/or other reference signals, such as tracking reference signals (TRSs), phase tracking reference signals (PTRSs), and/or DMRS. Based at least in part on substituting the other reference signals to maintain the frequency and/or time synchronization, SSB periodicity during this time may be less critical. For connected UEs having an SNR that satisfies a threshold, synchronization loop update rates may be lower, such that different synchronization RS rates may be required for different connected UEs depending on their SNR.

In some cases, because SSBs are broadcasted signals, the SSBs may be configured to target supporting UEs in worst-case conditions (e.g., cell edge UEs), and a corresponding minimal SSB periodicity may be employed to guarantee that these cell edge UEs residing at the targeted cell edge can be served. However, a higher SSB periodicity may be sufficient for synchronization loop maintenance for UEs that are experiencing a relatively high SNR (e.g., SNRs that satisfy an SNR threshold) or for UEs already residing in synchronization conditions and/or a steady state (e.g., post InitAck and initial convergence of synchronization loops). This may apply for SubThz systems, where a main sensitivity for synchronization may be based at least in part on time synchronization due to higher numerology and a smaller cyclic prefix duration. Residual PPM error and a corresponding time drift for the latter category of UEs (e.g., UEs with SNRs greater than a threshold or UEs that are already in synchronization condition) may be limited, such that an affordable time gap between consecutive occurrences of the same SSB can be higher while still supporting synchronization and/or maintaining a connection to the cell.

As described herein, an SSB burst may include a plurality of SSBs, such as four SSBs. Each SSB may include a PSS, an SSS, and a PBCH. Each SSB of the SSB burst may be associated with (e.g., may be transmitted using) a different TX beam used by the network node 405 to sweep or cover an entire cell range. SSB bursts may be transmitted periodically, such as with a periodicity of 5, 10, 20, 40, 80, or 160 ms. In some cases, the SSB may be transmitted using an OFDM waveform and may use several numerologies (e.g., depending on the cell carrier frequency). For example, depending on the numerology that is used, a different number of SSBs (or beams) can be included in a single SSB burst. In some cases, the SSB may be used to discover a cell, or to camp or connect to the cell (e.g., using an InitAck procedure), to maintain a continuous time and/or frequency synchronization with the network, to perform beam management procedures including serving beam and automatic gain control (AGC) tracking (e.g., in connected mode), and/or to maintain serving cell and neighbor cell measurements for mobility and handover procedure between the cells, among other examples.

From an initial acquisition or detection perspective, lower SSB periodicity may be beneficial for several reasons. For example, lower SSB periodicity may allow for better cell coverage (e.g., in terms of InitAck and cell measurements for different SSB-based procedures). A lower SNR may result in poor detection characteristics from a single SSB occurrence. The use of a non-coherent combining over several consecutive SSB occasions may allow for successful detection with extended coverage. Similarly, initial frequency, time, and PPM offset estimation may have a poor accuracy for low SNR that may limit a maximum time slamming range (e.g., based on initial PPM offset estimation) until a next SSB occurrence. The maximum applicable SSB burst period time may also be limited. In some cases, lower SSB periodicity may allow for a lower initial acquisition time from a UE beam sweep perspective.

From a frequency and time loop initial convergence perspective, lower SSB periodicity may be used to support low SNR conditions where multiple SSB repetitions can be averaged by a synchronization loop over a time window (or with a sufficient rate of loop updates) in order to achieve the required level of residual frequency and timing errors at the loop output for initiating a random access channel (RACH) procedure. In some cases, during a connected mode, a higher SSB periodicity may be used given that a good level of frequency/time synchronization can be maintained using reference signals other than SSB, such as the TRS, PTRS, and/or DMRS, among other examples.

In some cases, the lower SSB periodicity may be used for improving coverage of an initial acquisition and may be needed only for a small or limited number of UEs that reside in the cell range but have a poor SNR conditions (e.g., cell edge UEs). However, lower SSB periodicity may result in a higher SSB overhead and higher power consumption for the SSB TX. For the low SubThz coverage range, a much higher number of SubThz network nodes may be needed to cover the same area compared to lower bands when lower SSB periodicity is used.

In some cases, SubThz systems may have an increased number of beams (e.g., hundreds or thousands of beams) which may require more SSBs in each SSB burst set. Thus, each SSB burst transmission may consume more power and result in higher SSB related overhead compared to current deployments. In some cases, SubThz systems may use a higher SCS to deal with a stronger phase noise (PN). This high SCS may result in reduced frequency offset or PPM offset estimation accuracy (e.g., as a result of a shorter duration to observe the related phase accumulation) that may require more loop averaging (e.g., lower loop coefficients or responsiveness). A lower SSB periodicity may be required to keep the same order of loop bandwidth or loop responsiveness as in other bands. In some cases, the high SCS may lead to a shorter time duration of the CP which may limit the maximal time drift accumulation between loop updates and may require lower SSB periodicity to avoid timing drift (e.g., because of a residual PPM estimation errors) above a CP/2 range.

As described herein, the SSB may be an "always on" signal Thus, the SSB may be transmitted whether the UE 120 is in an active state or an inactive state. When the SSB is transmitted with lower periodicity (e.g., transmitted more frequently), the UE 120 may have less opportunities to enter the inactive (e.g., sleep) state of the UE 120. This may result in increased UE power consumption. Additionally, transmitting the SSB with lower periodicity than is needed may result in wasted network resources and increase signaling overhead.

Techniques and apparatuses are described herein for variable SSB communication. In some aspects, the network node may transmit, and the UE may receive, during a first portion of a time cycle, one or more SSBs according to a first periodicity. The first portion of the time cycle may be associated with initiating a connection between the UE and the network node, and the first periodicity may be based at least in part on an initial acquisition condition. The network node may transmit, and the UE may receive, during a second portion of the time cycle, one or more other SSBs according to a second periodicity that is higher than the first periodicity. The second portion of the time cycle may be associated with maintaining the connection between the UE and the network node, and the second periodicity may be based at least in part on a timing synchronization condition, a frequency synchronization condition, or a beam management condition.

As described above, when the SSB is transmitted with lower periodicity, the UE may have less opportunities to enter an inactive or sleep state. This may result in increased UE power consumption. Additionally, transmitting the SSB with lower periodicity than is needed may result in wasted network resources and increase signaling overhead. Using the techniques and apparatuses described herein, the SSBs may be transmitted with a first (e.g., lower) periodicity during a first portion of a time cycle and with a second (e.g., higher) periodicity during a second portion of the time cycle. This may result in decreased UE power consumption and lower network signaling overhead.

As indicated above, FIGS. 5A and 5B are provided as examples. Other examples may differ from what is described with regard to FIGS. 5A and 5B.

Figure 6:
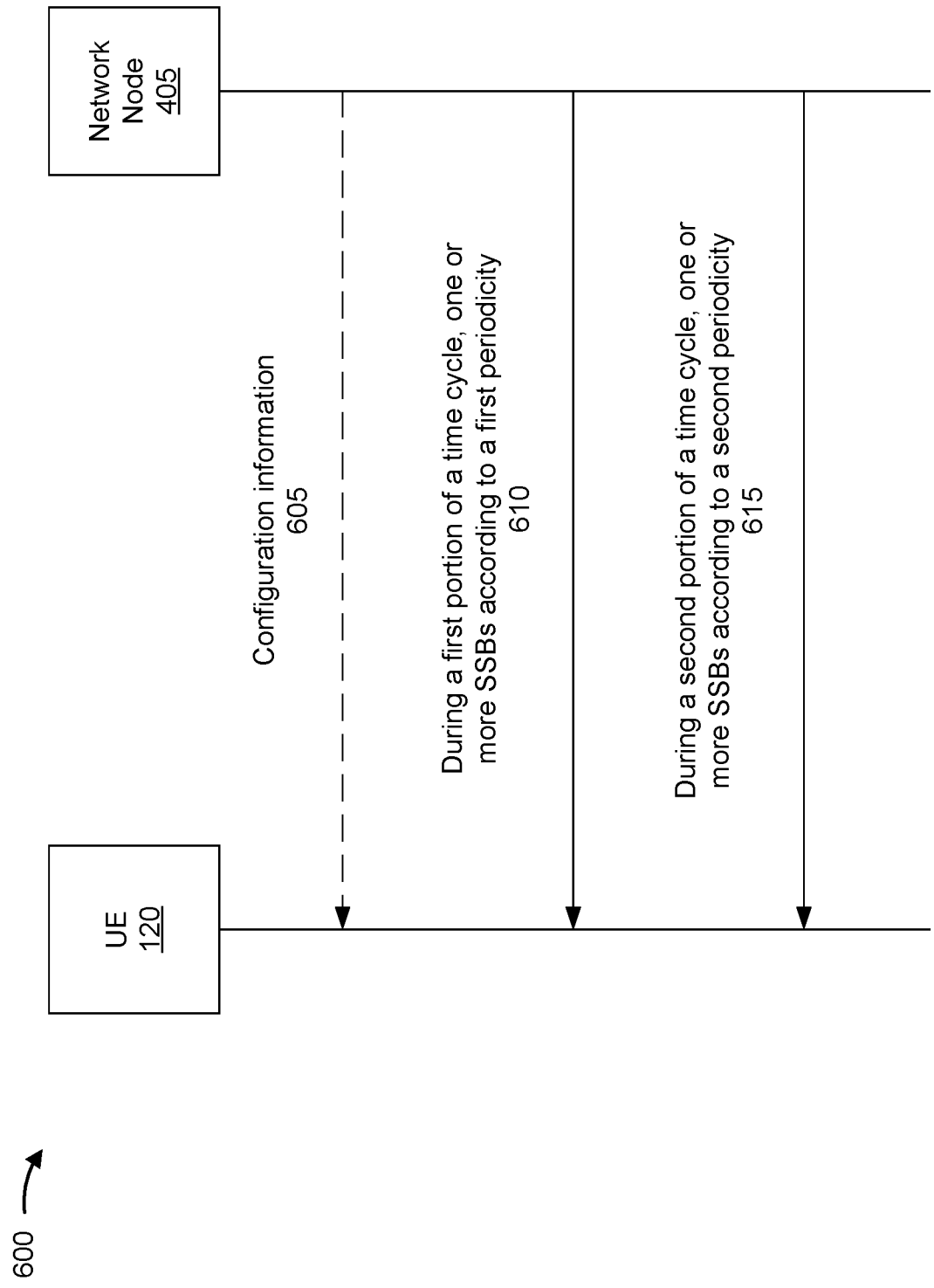
FIG. 6 is a diagram illustrating an example associated with variable SSB communication, in accordance with the present disclosure.

FIG. 6 is a diagram illustrating an example 600 of variable SSB communication, in accordance with the present disclosure.

As shown in connection with reference number 605, the network node 405 may transmit, and the UE 120 may receive, configuration information. The configuration information may include SSB configuration information, such as a duration of a time cycle, a duration of a first portion of the time cycle, a duration of a second portion of the time cycle, a first SSB periodicity and/or a second SSB periodicity, among other examples. Additional details regarding these features are described below.

As shown in connection with reference number 610, the network node 405 may transmit, and the UE 120 may receive, during a first portion of a time cycle, one or more SSBs according to a first periodicity. In some aspects, the first portion of the time cycle may be associated with initiating a connection between the UE 120 and the network node 405. In some aspects, the first periodicity may be based at least in part on an initial acquisition condition. The initial acquisition condition may be based at least in part on a characteristic of another UE that is located at a cell edge.

As shown in connection with reference number 615, the network node 405 may transmit, and the UE 120 may receive, during a second portion of the time cycle, one or more other SSBs according to a second periodicity. The second periodicity may be higher than the first periodicity. In some aspects, the second portion of the time cycle may be associated with maintaining the connection between the UE 120 and the network node 405. In some aspects, the second periodicity may be based at least in part on a timing synchronization condition, a frequency synchronization condition, or a beam management condition.

In some aspects, the UE 120 may establish a connection with the network node 405 during the first portion of the time cycle. The UE 120 may maintain the connection with the network node 405 during the second portion of the time cycle. For example, the UE 120 may maintain the connection with the network node 405 during the second portion of the time cycle based at least in part on an SNR associated with the connection satisfying an SNR threshold. In some aspects, the UE 120 may receive another reference signal to be used during the second portion of the time cycle based at least in part on the SNR associated with the connection failing to satisfy the SNR threshold. The other reference signal may be a UE-specific TRS or a UE-specific beam management CSI-RS. In some aspects, the UE 120 may maintain the connection with the network node 405, during a first portion of a subsequent cycle associated with the time cycle, based at least in part on the one or more SSBs (e.g., having the first periodicity). The UE 120 may maintain the connection with the network node 405, during the second portion of the subsequent cycle, based at least in part on the one or more other SSBs (e.g., having the second SSB periodicity) and the other reference signal. In some aspects, the UE 120 may deactivate the other reference signal during the first portion of the subsequent cycle, or may activate the other reference signal during the second portion of the subsequent cycle. In some aspects, the UE 120 may perform one or more cell measurements during the first portion of the time cycle based at least in part on the one or more SSBs, and may perform one or more other cell measurements during the second portion of the time cycle based at least in part on the one or more other SSBs and the other reference signal.

In some aspects, the variable SSB periodicity and adaptive UE-specific TRS may be used to reduce SSB related power consumption and overhead due to a lower SSB periodicity and increased number of SSB beams in the SubThz system. Since the SSB is a broadcast signal, the SSB may be configured for UEs with worst-case conditions (such as cell-edge UEs) and with a periodicity that improves the likelihood (e.g., guarantees) that these UEs can be served. However, UEs that are experiencing high SNR or that are residing in synchronization conditions (e.g., post-InitAck and initial synchronization loop convergence) may be able to use a higher SSB periodicity. After InitAck and initial synchronization loop convergence, synchronization loop and beam management may be maintained based at least in part on the UE-specific TRS and UE-specific beam management CSI-RS allocations. Thus, lower SSB periodicity may not be required for all UEs all the time, but rather only for initial acquisition and synchronization of cell edge UEs or for UEs with poor SNR conditions.

In some aspects, the UE-specific TRS may be transmitted only over network node beams that are used (or expected to be used) by the connected UEs such that every transmitted TRS dynamically follows a UE-specific beam. This is different from the traditional TRS (e.g., the cell-specific TRS) which provides a full spatial coverage of the cell and is transmitted as a broadcast reference signal over all network node TX beams. In SubThz systems, using the UE-specific TRS may be more efficient since the SubThz scenario is assumed to have an increased number of TX beams while the number of UEs in the cell is expected to be more limited due to the smaller cell size, increased UE battery resource requirement, and targeted minimum data volume.

As described herein, the constant SSB periodicity that is currently being used may be replaced by a variable SSB periodicity. The first periodicity for the SSB may be configured or employed during the first portion of the time cycle. The first periodicity may be determined according to an initial acquisition and initial synchronization loop convergence requirement of a "worst" UE or a cell edge UE that has not yet been connected to the cell (but should be served if is in the targeted cell range). For the second portion of the time cycle (e.g., the rest of the time cycle), the second periodicity for the SSB may be configured or employed. The second periodicity may be configured according to requirements related to a basic cell measurement rate, or a synchronization loop or beam management maintenance of connected UEs residing in SNR conditions that satisfy the SNR threshold. In contrast, UEs having the SNR conditions that do not satisfy the SNR threshold may be allocated with the corresponding UE-specific TRS with adjustable per UE SNR periodicity to allow the required level of synchronization for these UEs. The variable SSB periodicity with complementary and adaptively allocated UE-specific TRS (also having the corresponding variable periodicity pattern) may enable a low effective synchronization pilot overhead in the SubThz network, which may lead to a reduced reference signal overhead and power consumption for the UE and the network.

In some aspects, the variable SSB may be configured according to the following:

Assuming an outer time cycle of K slots/T [ms]:

For X % of the cycle, the SSB periodicity is set to be N [ms], where N is the periodicity required for InitAck and initial synchronization loop convergence for cell edge UEs. X % may be set according to the time window required in order to accomplish InitAck, beam search, and initial synchronization loop convergence for cell edge UEs.

For (100−X) % of the cycle, the SSB periodicity is set to be M[ms], where M=N C. C is an integer factor. M is a periodicity required for synchronization loop, AGC tracking, and beam management maintenance for UEs residing at SNR conditions that satisfy the SNR threshold.

In some aspects, UEs having the SNR that does not satisfy the SNR threshold may be able to connect to the network node 405 only during the first part of SSB cycle where the SSB has lower periodicity (and is transmitted more frequently). For these types of UEs, the InitAck procedure may take longer with the proposed variable SSB periodicity approach. In some aspects, UEs that are experiencing an SNR that does not satisfy the SNR threshold, and that are not able to maintain their synchronization loops and AGC tracking with the minimum required level of accuracy with SSB periodicity M [ms], may require the complementary UE-specific TRS during (100−X) % of the outer time cycle where SSB periodicity for these UEs is too high. Alternatively, a UE having an SNR that satisfies the SNR threshold may be able to perform InitAck and initial synchronization loop convergence faster than cell edge UEs and may be able to perform these procedures during the second part of SSB cycle (having the SSB periodicity M). In some aspects, cell measurements procedure may be performed during both parts of SSB cycle. This assumes that M does not go above a minimal required periodicity to support this part of UE functionality. In some aspects, connected UEs may be configured with information concerning the variable SSB periodicity and corresponding time boundaries for periodicities M and N for the serving cell and for the neighboring cells. In some aspects, setting M>N may lead to an SSB overhead reduction (compared to 100% time with SSB periodicity N) by factor of:

$$1 - \frac{N}{M} * \frac{(100-X)}{100} - 1 \cdot \frac{X}{100} = 1 - \frac{1}{C} \cdot \frac{(100-X)}{100} - \frac{X}{100}$$

In some aspects, the UE-specific TRS periodicity may be dynamically adopted, configured, and/or signaled during the outer time cycle (K slots) such that the effective combined reference signal periodicity for the tracking loops of a specific UE (SSB+UE-specific TRS) is not higher than the required minimum effective synchronization reference signal periodicity for the targeted level of accuracy of all the tracking loops at the SNR experienced by the UE. During (100−X) % of the outer time cycle where the SSB periodicity may be too high for the UE to keep the required level of synchronization (e.g., if the UE has an SNR that does not satisfy the SNR threshold), the adjustable UE-specific TRS periodicity may be employed such that a combined synchronization reference signal (SSB+UE-specific TRS) effective periodicity is equal to, or less than or equal to, the required minimum effective synchronization pilot or reference signal period time L ms corresponding to the SNR conditions experienced by the UE (where N≤L<M).

In some aspects, the UE-specific TRS may be active during (100−X) % of the outer time cycle for UEs having the SNR that does not satisfy the SNR threshold. This may require dynamic activation or deactivation of the UE-specific TRS for different parts of the outer time cycle (K slots duration). The TRS pattern or TRS periodicity during the TRS active time may be dynamically adopted as a function of the UE SNR. Variable TRS periodicity per UE or UE SNR can be achieved via dynamic reconfiguration of the UE-specific TRS. In some aspects, the variable L may be equal to N. In some aspects, the variable L may not be equal to N (e.g., if the UE is not a cell edge UE). However, in this case, L may need to be lower than M, since the SSB period time M may not be sufficient for proper synchronization loop tracking of the UE having the SNR that does not satisfy the SNR threshold.

In some aspects, UEs that experience different SNR conditions may be configured with a different SSB periodicity that can be selected based at least in part on a maximum expected cumulative timing drift between consecutive occasions of the same SSB. For example, when the SNR is decreased, the SSB periodicity may be decreased to avoid unacceptable time drift between consecutive SSB bursts. Additional details regarding these features are described in connection with FIG. 7.

As described above, the network node 405 may transmit configuration information associated with the variable SSB. In some aspects, the configuration information may indicate the time cycle duration. For example, the time cycle duration may be indicated for the variable SSB in units of radio frames (K) or in units of time duration (T in ms or s). In some aspects, a reference radio frame index (or an offset relative to radio frame index 0) that defines where the first (or any other) basic time cycle starts may be included in the list of explicitly or implicitly indicated UE parameters (such as the parameters described below). Using different reference starting points for the basic time cycle of the SSB may enable lower or higher SSB periodicity sub-periods to be coordinated between neighboring cells.

In some aspects, the network node 405 may transmit, and the UE 120 may receive, a list of parameters that provides information regarding the variable SSB. The list of parameters may be included in a system information block (SIB) or in a Master Information Block (MIB). In some aspects, the parameters may provide one or more of the following: the basic SSB cycle start time or location relative to a predefined reference radio frame index (in terms of number of radio frames), X % of basic SSB cycle duration for lower or higher SSB periodicity, N ms (the higher SSB periodicity), and/or M ms (the lower SSB periodicity), among other examples In some aspects, the parameters may indicate some or all of the required information regarding the variable SSB periodicity. The parameters may be exchanged and coordinated between cells and may be indicated to the UE 120 for the neighboring cells. In some cases, coordinating between the cells may enable higher and lower SSB periodicities to be applied in a staggered way between neighboring cells. This may enable a more uniform processing pattern on the UE side for serving cell SSB processing and neighboring cells measurements. In some aspects, the configuration information may be included in other SIBs. For example, under SIB2, the configuration information may convey an SSB measurement timing configuration (SMTC) window per neighboring cell (e.g., under the SSB-MTC information element) and may define an SSB measurement window duration and location (in time). With variable SSB periodicity, this part of the configuration may need to be extended accordingly to include new parameters for neighboring cells.

In some aspects, the UE-specific TRS may be allocated adaptively and dynamically by the network node 405 complementary to the SSB for UEs with poor reception conditions to comply with synchronization requirements (e.g., for cell edge UEs or UEs with the SNR that does not satisfy the SNR threshold). In some aspects, the network node 405 may evaluate which UEs should be allocated with the UE-specific TRS, the required TRS periodicity per UE depending on the SNR, and/or the time boundaries for active UE-specific TRS transmission (which may depend on the variable periodicity SSB pattern) that define the TRS pattern across the outer time period (K slots). This may result in a new effective tracking loop pilot periodicity L (SSB and TRS combination) per UE based at least in part on the SNR. In some aspects, the UE SNR in downlink can be reported by the UE or evaluated on the network side based at least in part on uplink measurements. Additionally, or alternatively, the UE SNR can be (roughly) derived based at least in part on the operational MCS for DL. In some aspects, the SSB and TRS periodicity (e.g., assuming SSB and TRS superposition), one or more of the following effective synchronization pilot periodicities can be obtained: 5 ms, 10 ms, 20 ms, 40 ms. In some aspects, a 160 ms periodicity for the TRS may be used.

As described above, when the SSB is transmitted with lower periodicity, the UE 120 may have less opportunities to enter an inactive or sleep state. This may result in increased UE 120 power consumption. Additionally, transmitting the SSB with lower periodicity than is needed may result in wasted network resources and increase signaling overhead. Using the techniques and apparatuses described herein, the SSBs may be transmitted with a first (e.g., lower) periodicity during a first portion of a time cycle and with a second (e.g., higher) periodicity during a second portion of the time cycle. This may result in decreased UE 120 power consumption and lower network signaling overhead.

As indicated above, FIG. 6 is provided as an example. Other examples may differ from what is described with regard to FIG. 6.

Figure 7:
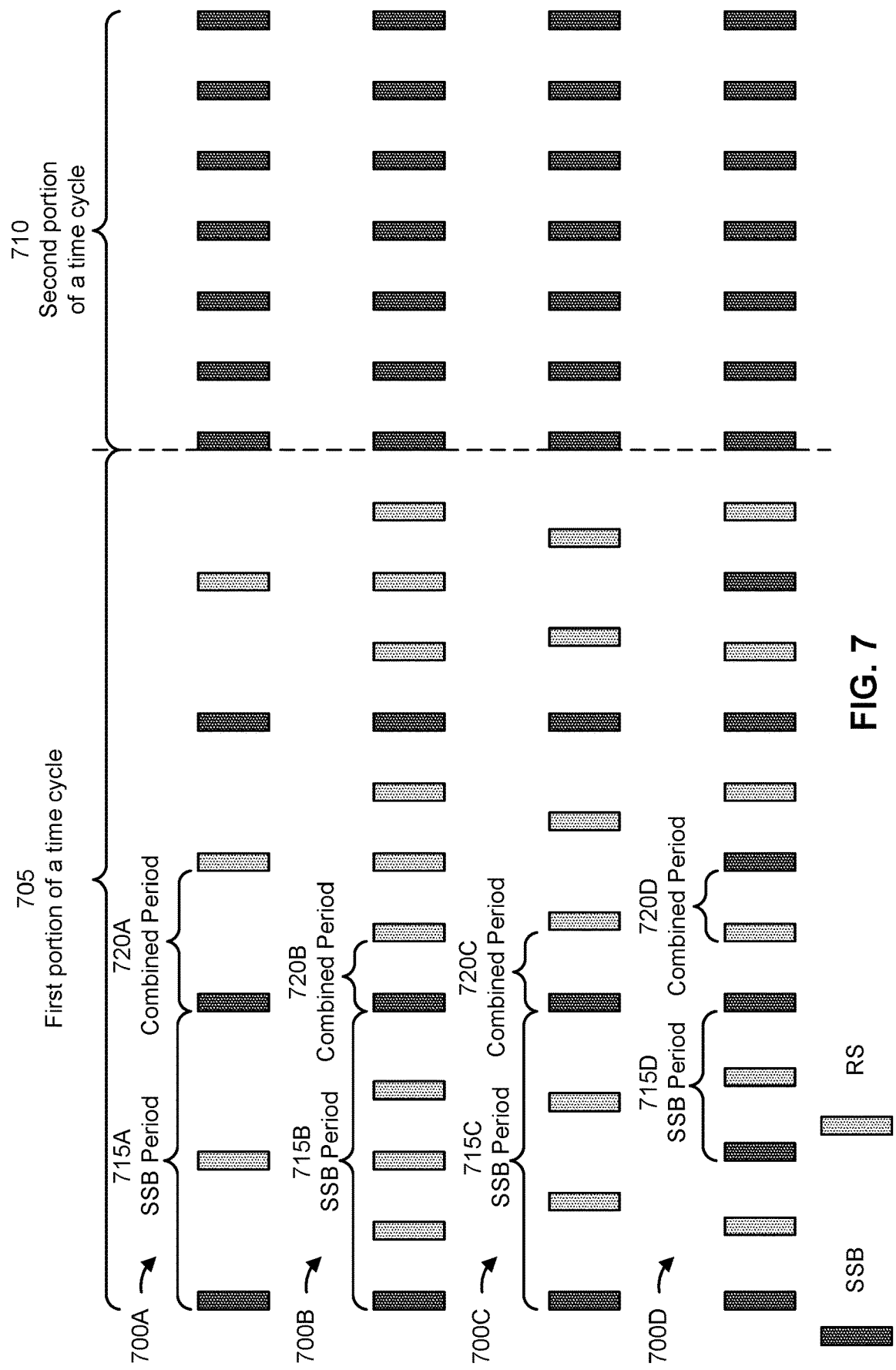
FIG. 7 is a diagram illustrating an example associated with using multiple SSB periodicities in a time cycle, in accordance with the present disclosure.

FIG. 7 is a diagram illustrating examples 700A, 700B, 700C, and 700D associated with using multiple SSB periodicities in a time cycle, in accordance with the present disclosure. The network node 405 may communicate with the UE 120 using a configuration of SSBs that includes a first portion having a first SSB periodicity and a second portion having a second SSB periodicity. The network node 405 may transmit reference signals between SSBs to supplement the SSBs and form a combined periodicity that is less than the first SSB periodicity. The network node 405 may transmit SSBs and reference signals within a first portion 705 of the time cycle and within a second portion 710 of the time cycle. In some aspects, the network node 405 and the UE 120 may be part of a wireless network (e.g., wireless network 100). The UE 120 and the network node 405 may have established a wireless connection prior to operations shown in FIG. 7. In some aspects, the UE 120 may be one of a number of UEs within a cell provided by the network node 405. In some aspects, the network node 405 may be configured to provide the cell for a geographical area and/or for a defined distance from the network node.

As shown in example 700A, the network node 405 may transmit the SSBs with an SSB period 715A and with a combined period 720A that includes the SSBs and reference signals transmitted between the SSBs. The SSB period 715A may be 4× an SSB period during the second portion of the time cycle. In this way, the SSBs may consume a reduced amount of overhead during the first portion of the time cycle. Additionally, the combined period 720A may be 2× the SSB period during the second portion of the time cycle. In this way, the combined overhead of the SSBs and the TRSs may be less during the first portion 705 of the time cycle than during the second portion 710 of the time cycle for the UE.

As shown in example 700B, the network node 405 may transmit the SSBs with an SSB period 715B and with a combined period 720B that includes the SSBs and reference signals transmitted between the SSBs. The SSB period 715B may be 4× an SSB period during the second portion of the time cycle. In this way, the SSBs may consume a reduced amount of overhead during the first portion of the time cycle. Additionally, the combined period 720B may be the same as the SSB period during the second portion of the time cycle. In this way, the combined overhead of the SSBs and the TRSs may be the same during the first portion 705 of the time cycle as during the second portion 710 of the time cycle for the UE of example 700B. However, the network node 405 may conserve network resources if other UEs in the cell have a lower combined periodicity than the UE of example 700B. For example, the UE of example 700B may be at a cell edge.

As shown in example 700C, the network node 405 may transmit the SSBs with an SSB period 715C and with a combined period 720C that includes the SSBs and reference signals transmitted between the SSBs. The SSB period 715C may be 4× an SSB period during the second portion of the time cycle. In this way, the SSBs may consume a reduced amount of overhead during the first portion of the time cycle. Additionally, the combined period 720C may be 4/3× the SSB period during the second portion of the time cycle. In this way, the combined overhead of the SSBs and the TRSs may be less during the first portion 705 of the time cycle than during the second portion 710 of the time cycle for the UE.

As shown in example 700D, the network node 405 may transmit the SSBs with an SSB period 715D and with a combined period 720D that includes the SSBs and reference signals transmitted between the SSBs. The SSB period 715D may be 2× an SSB period during the second portion of the time cycle. In this way, the SSBs may consume a reduced amount of overhead during the first portion of the time cycle. Additionally, the combined period 720D may be the same as the SSB period during the second portion of the time cycle. In this way, the combined overhead of the SSBs and the TRSs may be the same during the first portion 705 of the time cycle as during the second portion 710 of the time cycle for the UE of example 700D. However, the network node 405 may conserve network resources if other UEs in the cell have a lower combined periodicity than the UE of example 700B. For example, the UE of example 700B may be at a cell edge.

Different configurations of the SSB periods 715 may be used based at least in part on a minimum periodicity to support maintenance of the cell for UEs having a signal strength that satisfies a threshold and/or to support serving cell measurements and/or neighbor cell measurements. The combined periods 720 may be UE-specific, which may allow the network node to customize combined periods 720 to requirements of the UE and/or network conditions at the UE.

In some aspects, the first portion 705 of the time cycle may be longer than the second portion 710 of the time cycle. In other aspects, the first portion 705 of the time cycle may be shorter than the second portion 710 of the time cycle. In some aspects, the total time cycle (e.g., the first portion 705 and the second portion 710 combined) may be in a range of approximately 400 ms to approximately 10 second. The total time cycle may repeat for several time cycles. Although shown as the first portion 705 being before the second portion 710 in time, the first portion 705 (e.g., the portion with the higher SSB periodicity) may occur after the second portion 710 in time.

In some aspects, the SSB overhead and power reduction from applying the variable SSB periodicity compared to the constant SSB periodicity may be represented by factor of:

$$[M = 80 \text{ ms}, N = 20 \text{ ms},$$
$$X = 40\%] = \rightarrow 1 - \frac{20}{80} * \frac{(100-40)}{100} - \frac{40}{100} = 0.45 \rightarrow 45\%$$

However, the above does not consider the effect of the UE-specific TRS allocations. In one example, 100 UEs may be located within the cell, with various SNR distributions across the cell for these UEs. In this example, the network power consumption due to TRS transmission (to a specific UE) is equal to the SSB transmission power consumption over a single beam. In some cases, µ may be the SNR threshold. If the UE has an SNR that is below the SNR threshold, the UE may be allocated with the complementary TRS. In some cases, the network transmits the SSB across 300 beams. The following may be used to reach the power consumption reduction:

$$-1 * \#TRS * \left(\frac{1}{\#SSB \text{ beams}} * \left(\frac{N}{L}\right) * \left(1 - \frac{L}{M}\right)\right) * \left(\frac{100 - X}{100}\right)$$

As indicated, a higher number of UEs with good SNR conditions (defined as SNR>µ) from the total number of connected UEs corresponds to a higher potential gain in power reduction that can be achieved. To reach the same SSB TX related power reduction without the variable SSB and TRS (e.g., using the constant SSB), the base SSB periodicity (e.g., 20 ms) may need to be increased. Increased SSB periodicity may lead to a reduction in the cell range (compared to the original cell boundaries with the baseline/low SSB periodicity) as the baseline cell-edge UEs may not be able to be supported for InitAck once the baseline SSB periodicity has been increased.

As indicated above, FIG. 7 is provided as an example. Other examples may differ from what is described with respect to FIG. 7.

Figure 8:
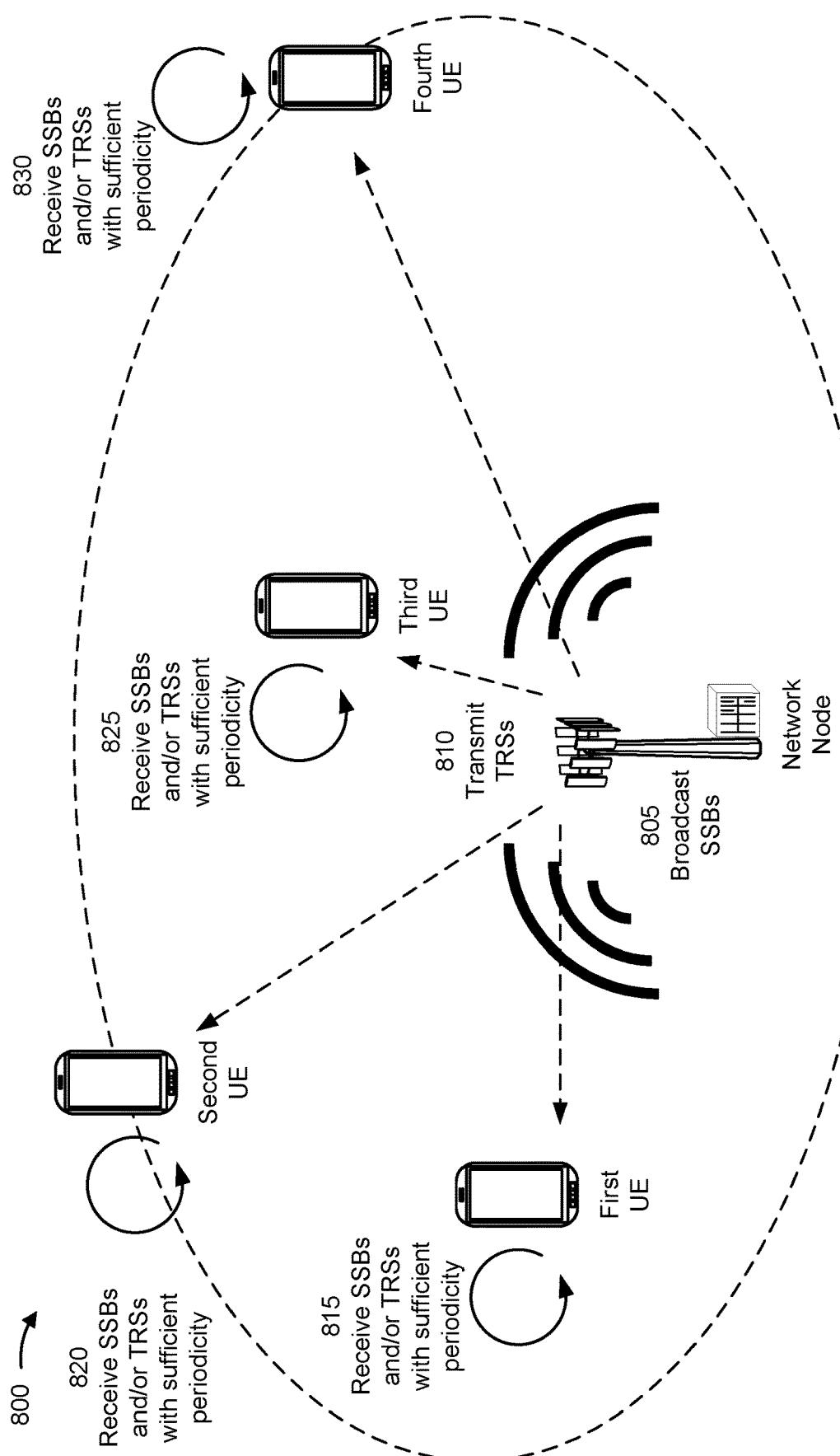
FIG. 8 is a diagram illustrating an example associated with using multiple SSB periodicities in a time cycle, in accordance with the present disclosure.

FIG. 8 is a diagram of an example 800 associated with using multiple SSB periodicities in a time cycle, in accordance with the present disclosure. In some aspects, the network node 405 and the UE 120 may be part of a wireless network (e.g., wireless network 100). The UE 120 and the network node 405 may have established wireless connections prior to operations shown in FIG. 8. In some aspects, the network node 405 may be configured to provide the cell for a geographical area and/or for a defined distance from the network node.

As shown by reference number 805, the network node 405 may broadcast SSBs. In some aspects, the network node 405 may broadcast SSBs using a variable periodicity. For example, the network node 405 may broadcast the SSBs with a first SSB periodicity during a first portion of a time cycle and with a second SSB periodicity during a second portion of the time cycle.

As shown by reference number 810, the network node 405 may transmit TRSs to UEs 120 for which the first periodicity is insufficient to maintain a connection in the cell.

As shown by reference number 815, a first UE 120 may receive SSBs and/or TRSs with sufficient periodicity. For example, the first UE 120 may have a signal strength in the cell that satisfies a threshold, which may result in the first UE 120 receiving SSBs and not TRSs to achieve the sufficient periodicity during the first portion of the time cycle.

As shown by reference number 820, a second UE 120 may receive SSBs and/or TRSs with sufficient periodicity. For example, the second UE 120 may be at a cell edge and may have a signal strength in the cell that fails to satisfy a threshold, which may result in the second UE 120 receiving SSBs and TRSs to achieve the sufficient periodicity during the first portion of the time cycle.

As shown by reference number 825, a third UE may receive SSBs and/or TRSs with sufficient periodicity. For example, the third UE 120 may have a signal strength in the cell that satisfies a threshold, which may result in the third UE 120 receiving SSBs and not TRSs to achieve the sufficient periodicity during the first portion of the time cycle.

As shown by reference number 830, a fourth UE 120 may receive SSBs and/or TRSs with sufficient periodicity. For example, the fourth UE 120 may be at a cell edge and may have a signal strength in the cell that fails to satisfy a threshold, which may result in the UE 120 receiving SSBs and TRSs to achieve the sufficient periodicity during the first portion of the time cycle.

In some aspects, the UEs 120 of the cell may receive TRSs with different periodicities. For example, the different periodicities may be based at least in part on capabilities of the UEs 120 (e.g., to maintain the cell with SSBs and/or RSs) and/or signal strengths at the UEs 120.

As indicated above, FIG. 8 is provided as an example. Other examples may differ from what is described with respect to FIG. 8.

Figure 9:
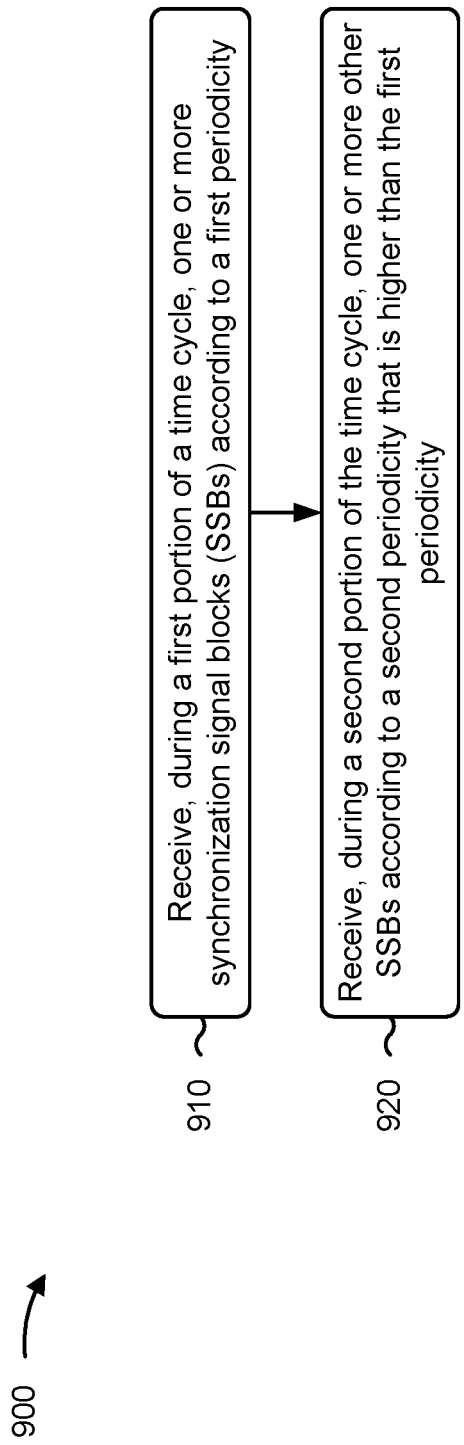
FIG. 9 is a diagram illustrating an example process associated with variable SSB communication, in accordance with the present disclosure.

FIG. 9 is a diagram illustrating an example process 900 performed, for example, by a UE, in accordance with the present disclosure. Example process 900 is an example where the UE (e.g., UE 120) performs operations associated with variable SSB communication.

As shown in FIG. 9, in some aspects, process 900 may include receiving, during a first portion of a time cycle, one or more SSBs according to a first periodicity (block 910). For example, the UE (e.g., using communication manager 140 and/or reception component 1102, depicted in FIG. 11) may receive, during a first portion of a time cycle, one or more SSBs according to a first periodicity, as described above.

As further shown in FIG. 9, in some aspects, process 900 may include receiving, during a second portion of the time cycle, one or more other SSBs according to a second periodicity that is higher than the first periodicity (block 920). For example, the UE (e.g., using communication manager 140 and/or reception component 1102, depicted in FIG. 11) may receive, during a second portion of the time cycle, one or more other SSBs according to a second periodicity that is higher than the first periodicity, as described above.

Process 900 may include additional aspects, such as any single aspect or any combination of aspects described below and/or in connection with one or more other processes described elsewhere herein.

In a first aspect, the first portion of the time cycle is associated with initiating a connection between the UE and a network node and the second portion of the time cycle is associated with maintaining the connection between the UE and the network node.

In a second aspect, alone or in combination with the first aspect, the first periodicity is based at least in part on an initial acquisition condition and the second periodicity is based at least in part on a timing synchronization condition, a frequency synchronization condition, or a beam management condition.

In a third aspect, alone or in combination with one or more of the first and second aspects, the initial acquisition condition is based at least in part on a characteristic of another UE that is located at a cell edge.

In a fourth aspect, alone or in combination with one or more of the first through third aspects, process 900 includes establishing a connection with a network node during the first portion of the time cycle.

In a fifth aspect, alone or in combination with one or more of the first through fourth aspects, process 900 includes maintaining the connection with the network node during the second portion of the time cycle based at least in part on a SNR associated with the connection satisfying an SNR threshold.

In a sixth aspect, alone or in combination with one or more of the first through fifth aspects, process 900 includes receiving another reference signal to be used during the second portion of the time cycle based at least in part on a SNR associated with the connection failing to satisfy an SNR threshold.

In a seventh aspect, alone or in combination with one or more of the first through sixth aspects, the other reference signal is a UE specific tracking reference signal or a UE specific beam management channel state information reference signal.

In an eighth aspect, alone or in combination with one or more of the first through seventh aspects, process 900 includes maintaining the connection with the network node, during a first portion of a subsequent cycle associated with the time cycle, based at least in part on the one or more SSBs, and maintaining the connection with the network node, during a second portion of the subsequent cycle, based at least in part on the one or more other SSBs and the other reference signal.

In a ninth aspect, alone or in combination with one or more of the first through eighth aspects, process 900 includes deactivating the other reference signal during the first portion of the subsequent cycle, or activating the other reference signal during the second portion of the subsequent cycle.

In a tenth aspect, alone or in combination with one or more of the first through ninth aspects, process 900 includes performing one or more cell measurements, during the first portion of the time cycle, based at least in part on the one or more SSBs, and performing one or more other cell measurements, during the second portion of the time cycle, based at least in part on the one or more other SSBs and the other reference signal.

In an eleventh aspect, alone or in combination with one or more of the first through tenth aspects, process 900 includes receiving configuration information that indicates at least one of a duration of the time cycle, a duration of the first portion of the time cycle, a duration of the second portion of the time cycle, the first periodicity, or the second periodicity.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
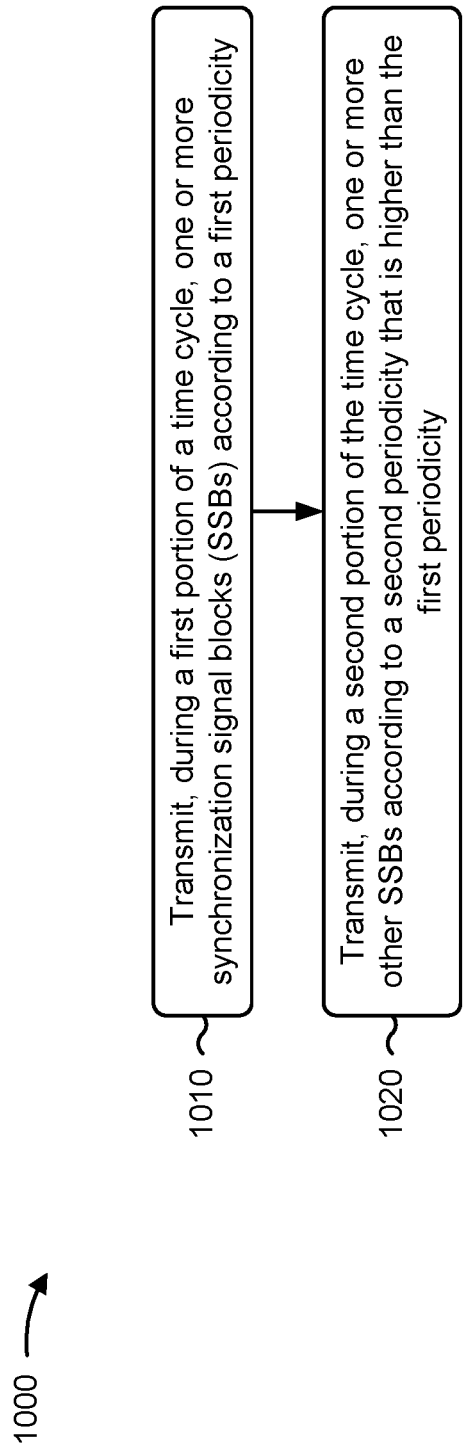
FIG. 10 is a diagram illustrating an example process associated with variable SSB communication, in accordance with the present disclosure.

FIG. 10 is a diagram illustrating an example process 1000 performed, for example, by a network node, in accordance with the present disclosure. Example process 1000 is an example where the network node (e.g., network node 405) performs operations associated with variable SSB communication. The network node may include some or all of the features of the base station 110, the CU 310, the DU 330, and/or the RU 340 described herein.

As shown in FIG. 10, in some aspects, process 1000 may include transmitting, during a first portion of a time cycle, one or more SSBs according to a first periodicity (block 1010). For example, the network node (e.g., using communication manager 150 and/or transmission component 1204, depicted in FIG. 12) may transmit, during a first portion of a time cycle, one or more SSBs according to a first periodicity, as described above.

As further shown in FIG. 10, in some aspects, process 1000 may include transmitting, during a second portion of the time cycle, one or more other SSBs according to a second periodicity that is higher than the first periodicity (block 1020). For example, the network node (e.g., using communication manager 150 and/or transmission component 1204, depicted in FIG. 12) may transmit, during a second portion of the time cycle, one or more other SSBs according to a second periodicity that is higher than the first periodicity, as described above.

Process 1000 may include additional aspects, such as any single aspect or any combination of aspects described below and/or in connection with one or more other processes described elsewhere herein.

In a first aspect, the first portion of the time cycle is associated with initiating a connection between a UE and the network node and the second portion of the time cycle is associated with maintaining the connection between the UE and the network node.

In a second aspect, alone or in combination with the first aspect, the first periodicity is based at least in part on an initial acquisition condition and the second periodicity is based at least in part on a timing synchronization condition, a frequency synchronization condition, or a beam management condition.

In a third aspect, alone or in combination with one or more of the first and second aspects, the initial acquisition condition is based at least in part on a characteristic of a UE that is located at a cell edge.

In a fourth aspect, alone or in combination with one or more of the first through third aspects, process 1000 includes receiving, from a UE, during the first portion of the time cycle, a request to establish a connection with the UE.

In a fifth aspect, alone or in combination with one or more of the first through fourth aspects, process 1000 includes maintaining the connection with the UE during the second portion of the time cycle based at least in part on a SNR associated with the connection satisfying an SNR threshold.

In a sixth aspect, alone or in combination with one or more of the first through fifth aspects, process 1000 includes transmitting another reference signal to be used during the second portion of the time cycle based at least in part on a SNR associated with the connection failing to satisfy an SNR threshold.

In a seventh aspect, alone or in combination with one or more of the first through sixth aspects, the other reference signal is a UE specific tracking reference signal or a UE specific beam management channel state information reference signal.

In an eighth aspect, alone or in combination with one or more of the first through seventh aspects, process 1000 includes maintaining the connection with the UE, during a first portion of a subsequent cycle associated with the time cycle, based at least in part on the one or more SSBs, and maintaining the connection with the UE, during a second portion of the subsequent cycle, based at least in part on the one or more other SSBs and the other reference signal.

In a ninth aspect, alone or in combination with one or more of the first through eighth aspects, process 1000 includes receiving an indication of one or more cell measurements, during the first portion of the time cycle, based at least in part on the one or more SSBs, and receiving an indication of one or more other cell measurements, during the second portion of the time cycle, based at least in part on the one or more other SSBs and the other reference signal.

In a tenth aspect, alone or in combination with one or more of the first through ninth aspects, process 1000 includes transmitting configuration information that indicates at least one of a duration of the time cycle, a duration of the first portion of the time cycle, a duration of the second portion of the time cycle, the first periodicity, or the second periodicity.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
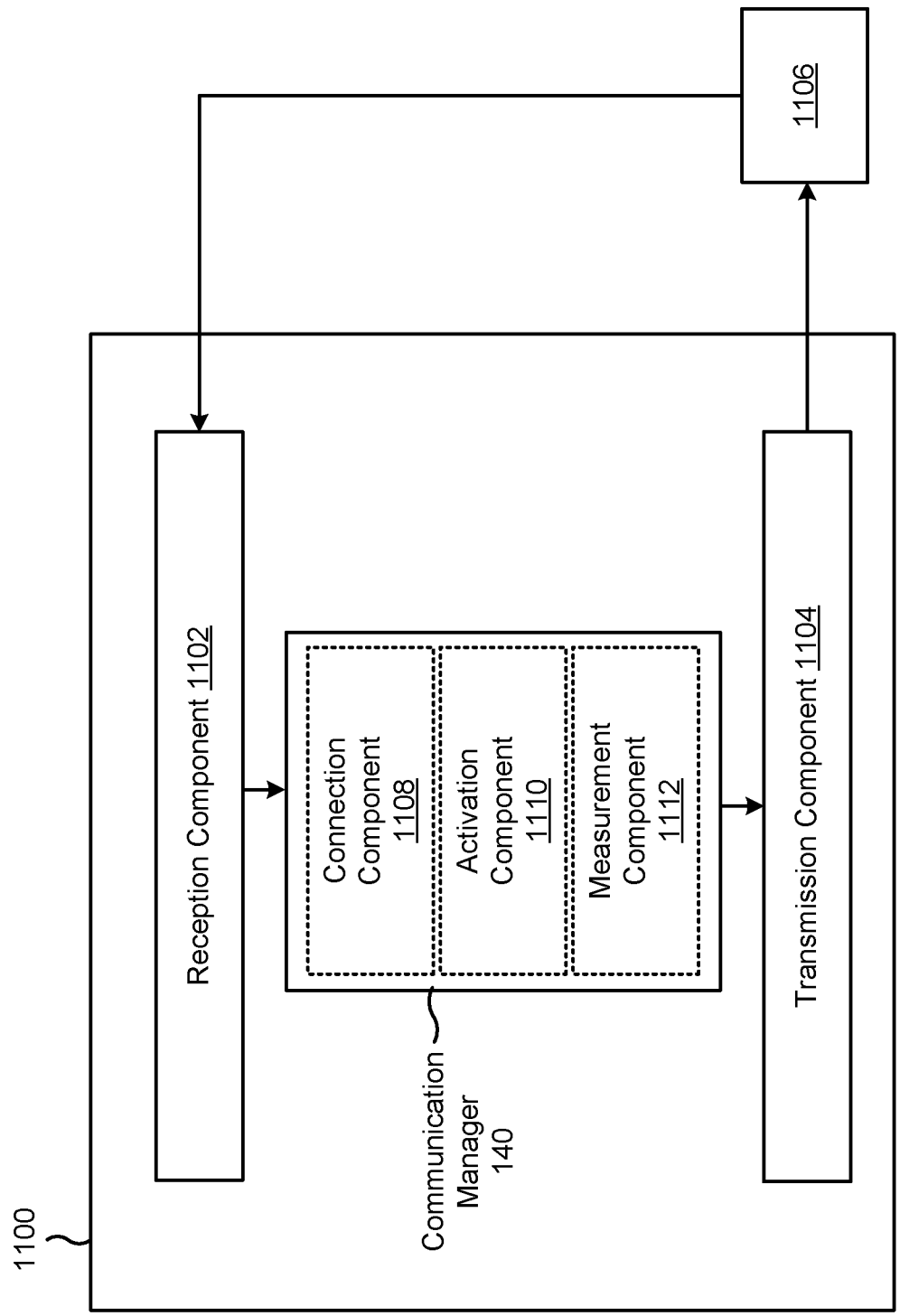
FIG. 11 is a diagram of an example apparatus for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a connection component 1108, an activation component 1110, or a measurement component 1112, among other examples.

In some aspects, the apparatus 1100 may be configured to perform one or more operations described herein in connection with FIGS. 6-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, during a first portion of a time cycle, one or more SSBs according to a first periodicity. The reception component 1102 may receive, during a second portion of the time cycle, one or more other SSBs according to a second periodicity that is higher than the first periodicity.

The connection component 1108 may establish a connection with a network node during the first portion of the time cycle. The connection component 1108 may maintain the connection with the network node during the second portion of the time cycle based at least in part on a SNR associated with the connection satisfying an SNR threshold.

The reception component 1102 may receive another reference signal to be used during the second portion of the time cycle based at least in part on a SNR associated with the connection failing to satisfy an SNR threshold.

The connection component 1108 may maintain the connection with the network node, during a first portion of a subsequent cycle associated with the time cycle, based at least in part on the one or more SSBs. The connection component 1108 may maintain the connection with the network node, during a second portion of the subsequent cycle, based at least in part on the one or more other SSBs and the other reference signal.

The activation component 1110 may deactivate the other reference signal during the first portion of the subsequent cycle. The activation component 1110 may activate the other reference signal during the second portion of the subsequent cycle.

The measurement component 1112 may perform one or more cell measurements, during the first portion of the time cycle, based at least in part on the one or more SSBs. The measurement component 1112 may perform one or more other cell measurements, during the second portion of the time cycle, based at least in part on the one or more other SSBs and the other reference signal.

The reception component 1102 may receive configuration information that indicates at least one of a duration of the time cycle, a duration of the first portion of the time cycle, a duration of the second portion of the time cycle, the first periodicity, or the second periodicity.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
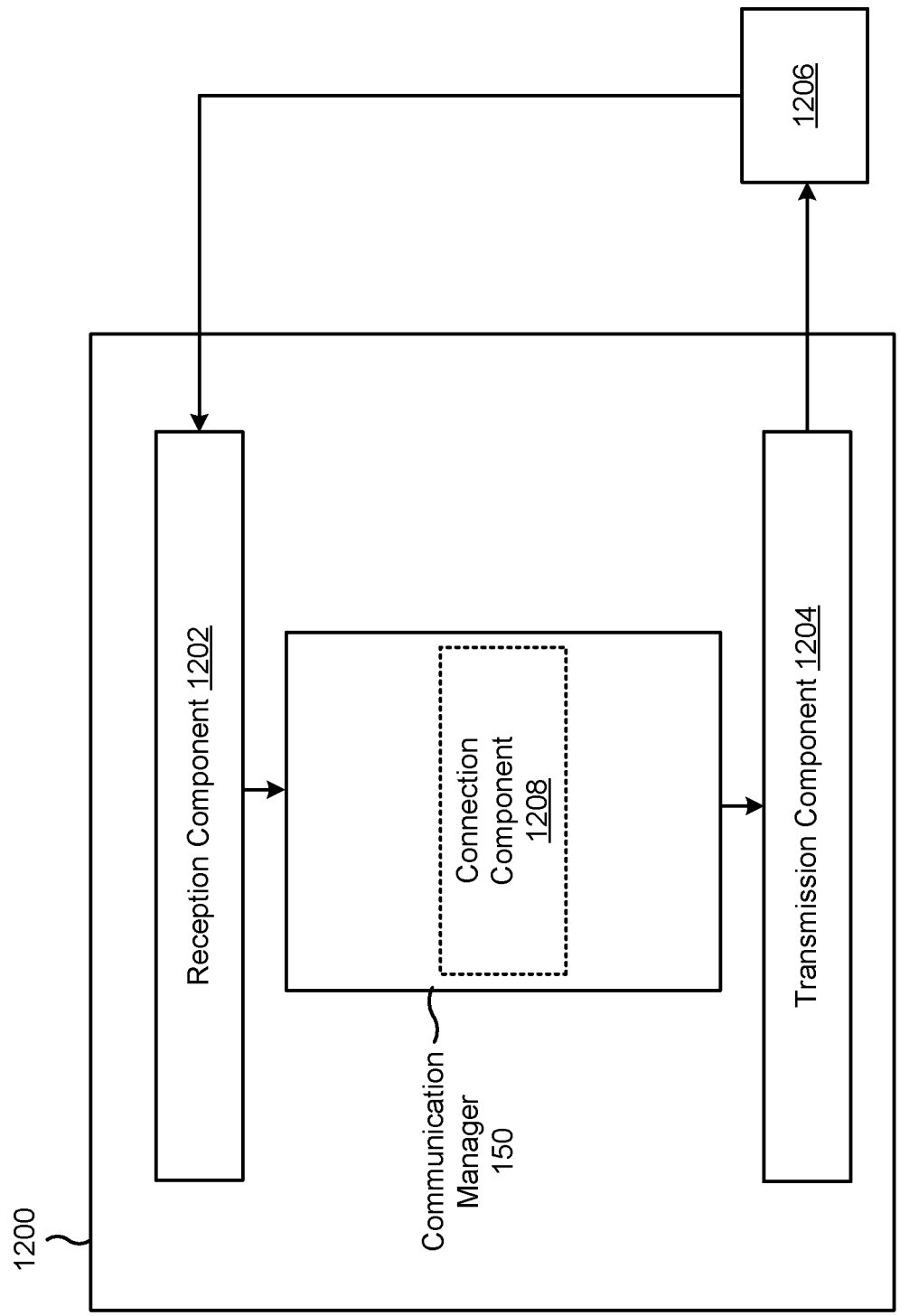
FIG. 12 is a diagram of an example apparatus for wireless communication, in accordance with the present disclosure.

FIG. 12 is a diagram of an example apparatus 1200 for wireless communication. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a connection component 1208, among other examples.

In some aspects, the apparatus 1200 may be configured to perform one or more operations described herein in connection with FIGS. 6-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The transmission component 1204 may transmit, during a first portion of a time cycle, one or more SSBs according to a first periodicity. The transmission component 1204 may transmit, during a second portion of the time cycle, one or more other SSBs according to a second periodicity that is higher than the first periodicity.

The reception component 1202 may receive, from a UE, during the first portion of the time cycle, a request to establish a connection with the UE. The connection component 1208 may maintain the connection with the UE during the second portion of the time cycle based at least in part on a SNR associated with the connection satisfying an SNR threshold. The transmission component 1204 may transmit another reference signal to be used during the second portion of the time cycle based at least in part on a SNR associated with the connection failing to satisfy an SNR threshold.

The connection component 1208 may maintain the connection with the UE, during a first portion of a subsequent cycle associated with the time cycle, based at least in part on the one or more SSBs. The connection component 1208 may maintain the connection with the UE, during a second portion of the subsequent cycle, based at least in part on the one or more other SSBs and the other reference signal.

The reception component 1202 may receive an indication of one or more cell measurements, during the first portion of the time cycle, based at least in part on the one or more SSBs. The reception component 1202 may receive an indication of one or more other cell measurements, during the second portion of the time cycle, based at least in part on the one or more other SSBs and the other reference signal. The transmission component 1204 may transmit configuration information that indicates at least one of a duration of the time cycle, a duration of the first portion of the time cycle, a duration of the second portion of the time cycle, the first periodicity, or the second periodicity.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, during a first portion of a time cycle, one or more synchronization signal blocks (SSBs) according to a first periodicity; and receiving, during a second portion of the time cycle, one or more other SSBs according to a second periodicity that is higher than the first periodicity.

Aspect 2: The method of Aspect 1, wherein the first portion of the time cycle is associated with initiating a connection between the UE and a network node and the second portion of the time cycle is associated with maintaining the connection between the UE and the network node.

Aspect 3: The method of any of Aspects 1-2, wherein the first periodicity is based at least in part on an initial acquisition condition and the second periodicity is based at least in part on a timing synchronization condition, a frequency synchronization condition, or a beam management condition.

Aspect 4: The method of Aspect 3, wherein the initial acquisition condition is based at least in part on a characteristic of another UE that is located at a cell edge.

Aspect 5: The method of any of Aspects 1-4, further comprising establishing a connection with a network node during the first portion of the time cycle.

Aspect 6: The method of Aspect 5, further comprising maintaining the connection with the network node during the second portion of the time cycle based at least in part on a signal to noise ratio (SNR) associated with the connection satisfying an SNR threshold.

Aspect 7: The method of Aspect 5, further comprising receiving another reference signal to be used during the second portion of the time cycle based at least in part on a signal to noise ratio (SNR) associated with the connection failing to satisfy an SNR threshold.

Aspect 8: The method of Aspect 7, wherein the other reference signal is a UE specific tracking reference signal or a UE specific beam management channel state information reference signal.

Aspect 9: The method of Aspect 7, further comprising: maintaining the connection with the network node, during a first portion of a subsequent cycle associated with the time cycle, based at least in part on the one or more SSBs; and maintaining the connection with the network node, during a second portion of the subsequent cycle, based at least in part on the one or more other SSBs and the other reference signal.

Aspect 10: The method of Aspect 9, further comprising: deactivating the other reference signal during the first portion of the subsequent cycle; or activating the other reference signal during the second portion of the subsequent cycle.

Aspect 11: The method of any of Aspects 1-10, further comprising: performing one or more cell measurements, during the first portion of the time cycle, based at least in part on the one or more SSBs; and performing one or more other cell measurements, during the second portion of the time cycle, based at least in part on the one or more other SSBs and the other reference signal.

Aspect 12: The method of any of Aspects 1-11, further comprising receiving configuration information that indicates at least one of a duration of the time cycle, a duration of the first portion of the time cycle, a duration of the second portion of the time cycle, the first periodicity, or the second periodicity.

Aspect 13: A method of wireless communication performed by a network node, comprising: transmitting, during a first portion of a time cycle, one or more synchronization signal blocks (SSBs) according to a first periodicity; and transmitting, during a second portion of the time cycle, one or more other SSBs according to a second periodicity that is higher than the first periodicity.

Aspect 14: The method of Aspect 13, wherein the first portion of the time cycle is associated with initiating a connection between a user equipment (UE) and the network node and the second portion of the time cycle is associated with maintaining the connection between the UE and the network node.

Aspect 15: The method of any of Aspects 13-14, wherein the first periodicity is based at least in part on an initial acquisition condition and the second periodicity is based at least in part on a timing synchronization condition, a frequency synchronization condition, or a beam management condition.

Aspect 16: The method of Aspect 15, wherein the initial acquisition condition is based at least in part on a characteristic of a user equipment (UE) that is located at a cell edge.

Aspect 17: The method of any of Aspects 13-16, further comprising receiving, from a user equipment (UE), during the first portion of the time cycle, a request to establish a connection with the UE.

Aspect 18: The method of Aspect 17, further comprising maintaining the connection with the UE during the second portion of the time cycle based at least in part on a signal to noise ratio (SNR) associated with the connection satisfying an SNR threshold.

Aspect 19: The method of Aspect 17, further comprising transmitting another reference signal to be used during the second portion of the time cycle based at least in part on a signal to noise ratio (SNR) associated with the connection failing to satisfy an SNR threshold.

Aspect 20: The method of Aspect 19, wherein the other reference signal is a UE specific tracking reference signal or a UE specific beam management channel state information reference signal.

Aspect 21: The method of Aspect 19, further comprising: maintaining the connection with the UE, during a first portion of a subsequent cycle associated with the time cycle, based at least in part on the one or more SSBs; and maintaining the connection with the UE, during a second portion of the subsequent cycle, based at least in part on the one or more other SSBs and the other reference signal.

Aspect 22: The method of any of Aspects 13-21, further comprising: receiving an indication of one or more cell measurements, during the first portion of the time cycle, based at least in part on the one or more SSBs; and receiving an indication of one or more other cell measurements, during the second portion of the time cycle, based at least in part on the one or more other SSBs and the other reference signal.

Aspect 23: The method of any of Aspects 13-22, further comprising transmitting configuration information that indicates at least one of a duration of the time cycle, a duration of the first portion of the time cycle, a duration of the second portion of the time cycle, the first periodicity, or the second periodicity.

Aspect 24: An apparatus for wireless communication at a device, comprising a processor; memory coupled with the processor; and instructions stored in the memory and executable by the processor to cause the apparatus to perform the method of one or more of Aspects 1-12.

Aspect 25: A device for wireless communication, comprising a memory and one or more processors coupled to the memory, the one or more processors configured to perform the method of one or more of Aspects 1-12.

Aspect 26: An apparatus for wireless communication, comprising at least one means for performing the method of one or more of Aspects 1-12.

Aspect 27: A non-transitory computer-readable medium storing code for wireless communication, the code comprising instructions executable by a processor to perform the method of one or more of Aspects 1-12.

Aspect 28: A non-transitory computer-readable medium storing a set of instructions for wireless communication, the set of instructions comprising one or more instructions that, when executed by one or more processors of a device, cause the device to perform the method of one or more of Aspects 1-12.

Aspect 29: An apparatus for wireless communication at a device, comprising a processor; memory coupled with the processor; and instructions stored in the memory and executable by the processor to cause the apparatus to perform the method of one or more of Aspects 13-23.

Aspect 30: A device for wireless communication, comprising a memory and one or more processors coupled to the memory, the one or more processors configured to perform the method of one or more of Aspects 13-23.

Aspect 31: An apparatus for wireless communication, comprising at least one means for performing the method of one or more of Aspects 13-23.

Aspect 32: A non-transitory computer-readable medium storing code for wireless communication, the code comprising instructions executable by a processor to perform the method of one or more of Aspects 13-23.

Aspect 33: A non-transitory computer-readable medium storing a set of instructions for wireless communication, the set of instructions comprising one or more instructions that, when executed by one or more processors of a device, cause the device to perform the method of one or more of Aspects 13-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
receive configuration information that indicates at least one of a duration of a time cycle, a duration of a first portion of the time cycle, or a duration of a second portion of the time cycle;
receive, based at least in part on receiving the configuration information and during the first portion of the time cycle, one or more first synchronization signal blocks (SSBs) according to a first periodicity;
receive, based at least in part on receiving the configuration information and during the second portion of the time cycle, one or more second SSBs according to a second periodicity,
wherein the second periodicity is higher than the first periodicity, and
wherein the first portion of the time cycle is associated with initiating a connection between the UE and a network node and the second portion of the time cycle is associated with maintaining the connection between the UE and the network node;
transmit an indication of one or more first cell measurements, wherein the one or more first measurements are during the first portion of the time cycle and based at least in part on the one or more first SSBs; and
transmit an indication of one or more second cell measurements, wherein the one or more second cell measurements are during the second portion of the time cycle and based at least in part on the one or more second SSBs and another reference signal.

2. The apparatus of claim 1,
wherein the first periodicity is based at least in part on an initial acquisition condition and the second periodicity is based at least in part on a timing synchronization condition, a frequency synchronization condition, or a beam management condition.

3. The apparatus of claim 2,
wherein the initial acquisition condition is based at least in part on a characteristic of another UE that is located at a cell edge.

4. The apparatus of claim 1,
wherein the one or more processors are further configured to initiate the connection between the UE and the network node during the first portion of the time cycle.

5. The apparatus of claim 1,
wherein the one or more processors are further configured to maintain the connection between the UE and the network node during the second portion of the time cycle based at least in part on a signal to noise ratio (SNR) associated with the connection satisfying an SNR threshold.

6. The apparatus of claim 1,
wherein the one or more processors are further configured to receive the other reference signal to be used during the second portion of the time cycle based at least in part on a signal to noise ratio (SNR) associated with the connection failing to satisfy an SNR threshold.

7. The apparatus of claim 1,
wherein the other reference signal is a UE specific tracking reference signal or a UE specific beam management channel state information reference signal.

8. The apparatus of claim 1,
wherein the one or more processors are further configured to:
maintain the connection with the network node, during a first portion of a subsequent cycle associated with the time cycle, based at least in part on the one or more first SSBs; and
maintain the connection with the network node, during a second portion of the subsequent cycle, based at least in part on the one or more second SSBs and the other reference signal.

9. The apparatus of claim 8,
wherein the one or more processors are further configured to:
deactivate the other reference signal during the first portion of the subsequent cycle; or
activate the other reference signal during the second portion of the subsequent cycle.

10. The apparatus of claim 1,
wherein the one or more processors are further configured to:
perform the one or more first cell measurements, during the first portion of the time cycle, based at least in part on the one or more first SSBs; and
perform the one or more second cell measurements, during the second portion of the time cycle, based at least in part on the one or more second SSBs and the other reference signal.

11. The apparatus of claim 1,
wherein the configuration information further indicates at least one of the first periodicity or the second periodicity.

12. An apparatus for wireless communication at a network node, comprising:
one or more memories; and
one or more processors, coupled to the one or more memories, configured to:
transmit configuration information that indicates at least one of a duration of a time cycle, a duration of a first portion of the time cycle, or a duration of a second portion of the time cycle;
transmit, based at least in part on transmitting the configuration information and during the first portion of the time cycle, one or more first synchronization signal blocks (SSBs) according to a first periodicity;
transmit, based at least in part on transmitting the configuration information and during the second portion of the time cycle, one or more second SSBs according to a second periodicity,
wherein the second periodicity is higher than the first periodicity, and
wherein the first portion of the time cycle is associated with initiating a connection between a user equipment (UE) and the network node and the second portion of the time cycle is associated with maintaining the connection between the UE and the network node;

receive an indication of one or more first cell measurements, wherein the one or more first measurements are during the first portion of the time cycle and based at least in part on the one or more first SSBs; and receive an indication of one or more second cell measurements, wherein the one or more second measurements are during the second portion of the time cycle and based at least in part on the one or more second SSBs and another reference signal.

13. The apparatus of claim 12, wherein the first periodicity is based at least in part on an initial acquisition condition and the second periodicity is based at least in part on a timing synchronization condition, a frequency synchronization condition, or a beam management condition.

14. The apparatus of claim 13, wherein the initial acquisition condition is based at least in part on a characteristic of the UE, wherein the UE is located at a cell edge.

15. The apparatus of claim 12, wherein the one or more processors are further configured to receive, from the UE and during the first portion of the time cycle, a request to initiate the connection between the UE and the network node.

16. The apparatus of claim 12, wherein the one or more processors are further configured to maintain the connection between the UE and the network node during the second portion of the time cycle based at least in part on a signal to noise ratio (SNR) associated with the connection satisfying an SNR threshold.

17. The apparatus of claim 12, wherein the one or more processors are further configured to transmit the other reference signal to be used during the second portion of the time cycle based at least in part on a signal to noise ratio (SNR) associated with the connection failing to satisfy an SNR threshold.

18. The apparatus of claim 12, wherein the other reference signal is a UE specific tracking reference signal or a UE specific beam management channel state information reference signal.

19. The apparatus of claim 12, wherein the one or more processors are further configured to:

maintain the connection with the UE, during a first portion of a subsequent cycle associated with the time cycle, based at least in part on the one or more first SSBs; and maintain the connection with the UE, during a second portion of the subsequent cycle, based at least in part on the one or more second SSBs and the other reference signal.

20. The apparatus of claim 12, wherein the configuration information further indicates at least one of the first periodicity or the second periodicity.

21. A method of wireless communication performed by a user equipment (UE), comprising:

receiving configuration information that indicates at least one of a duration of a time cycle, a duration of a first portion of the time cycle, or a duration of a second portion of the time cycle;

receiving, based at least in part on receiving the configuration information and during the first portion of the time cycle, one or more first synchronization signal blocks (SSBs) according to a first periodicity;

receiving, based at least in part on receiving the configuration information and during the second portion of the time cycle, one or more second SSBs according to a second periodicity, wherein the second periodicity is higher than the first periodicity, and wherein the first portion of the time cycle is associated with initiating a connection between the UE and a network node and the second portion of the time cycle is associated with maintaining the connection between the UE and the network node;

transmitting an indication of one or more first cell measurements, wherein the one or more first cell measurements are during the first portion of the time cycle and based at least in part on the one or more first SSBs; and transmitting an indication of one or more second cell measurements, wherein the one or more second cell measurements are during the second portion of the time cycle and based at least in part on the one or more second SSBs and another reference signal.

22. The method of claim 21, wherein the first periodicity is based at least in part on an initial acquisition condition and the second periodicity is based at least in part on a timing synchronization condition, a frequency synchronization condition, or a beam management condition.

23. The method of claim 21, further comprising:
initiating the connection between the UE and the network node during the first portion of the time cycle, and
maintaining the connection between the UE and the network node during the second portion of the time cycle based at least in part on a signal to noise ratio (SNR) associated with the connection satisfying an SNR threshold.

24. The method of claim 21, further comprising:
performing the one or more first cell measurements, during the first portion of the time cycle, based at least in part on the one or more first SSBs; and
performing the one or more second cell measurements, during the second portion of the time cycle, based at least in part on the one or more second SSBs and the other reference signal.

25. The method of claim 21, wherein the configuration information further indicates at least one of the first periodicity or the second periodicity.

26. The method of claim 21, further comprising:
initiating the connection between the UE and the network node during the first portion of the time cycle.

27. A method of wireless communication performed by a network node, comprising:

transmitting configuration information that indicates at least one of a duration of a time cycle, a duration of a first portion of the time cycle, or a duration of a second portion of the time cycle;

transmitting, based at least in part on transmitting the configuration information and during the first portion of the time cycle, one or more first synchronization signal blocks (SSBs) according to a first periodicity;

transmitting, based at least in part on transmitting the configuration information and during the second portion of the time cycle, one or more second SSBs according to a second periodicity, wherein the second periodicity is higher than the first periodicity, and wherein the first portion of the time cycle is associated with initiating a connection between a user equipment (UE) and the network node and the second portion of the time cycle is associated with maintaining the connection between the UE and the network node;

receiving an indication of one or more first cell measurements, wherein the one or more first cell measurements are during the first portion of the time cycle and based at least in part on the one or more first SSBs; and receiving an indication of one or more second cell measurements, wherein the one or more second cell measurements are during the second portion of the time cycle and based at least in part on the one or more second SSBs and another reference signal.

28. The method of claim 27,
wherein the first periodicity is based at least in part on an initial acquisition condition and the second periodicity is based at least in part on a timing synchronization condition, a frequency synchronization condition, or a beam management condition.

29. The method of claim 27, further comprising:
receiving, from the UE and during the first portion of the time cycle, a request to initiate the connection between the UE and the network node; and maintaining the connection with the UE and the network node during the second portion of the time cycle based at least in part on a signal to noise ratio (SNR) associated with the connection satisfying an SNR threshold.

30. The method of claim 27, further comprising:
maintain the connection between the UE and the network node during the second portion of the time cycle based at least in part on a signal to noise ratio (SNR) associated with the connection satisfying an SNR threshold.

* * * * *